US008670133B2

(12) United States Patent
Koura

(10) Patent No.: US 8,670,133 B2
(45) Date of Patent: Mar. 11, 2014

(54) DOCUMENT READING APPARATUS AND METHOD WITH SELECTION MODE

(75) Inventor: Toshitsugu Koura, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 237 days.

(21) Appl. No.: 13/093,712

(22) Filed: Apr. 25, 2011

(65) Prior Publication Data

US 2011/0273735 A1 Nov. 10, 2011

(30) Foreign Application Priority Data

May 10, 2010 (JP) ................................. 2010-108057

(51) Int. Cl.
*G06F 3/12* (2006.01)

(52) U.S. Cl.
USPC ............................ 358/1.13; 358/1.9; 709/223

(58) Field of Classification Search
USPC ......................................... 358/1.13, 1.15, 1.9
See application file for complete search history.

(56) References Cited

U.S. PATENT DOCUMENTS

2006/0197981 A1* 9/2006 Honma ........................ 358/1.15
2008/0021991 A1* 1/2008 Kawai ........................... 709/223
2009/0021771 A1* 1/2009 Salgado et al. .............. 358/1.15
2011/0032562 A1* 2/2011 McCuen et al. ............. 358/1.15
2011/0242561 A1* 10/2011 Nitta ............................. 358/1.9

FOREIGN PATENT DOCUMENTS

JP 2004-246283 2/2004
JP 2005-024881 1/2005
JP 2009-076959 9/2009

* cited by examiner

*Primary Examiner* — Benny Q Tieu
*Assistant Examiner* — Juan M Guillermety
(74) *Attorney, Agent, or Firm* — Adli Law Group P.C.

(57) ABSTRACT

A print mode selecting unit configured to select a print mode based on user input to be either a normal print mode or a saving print mode including print settings associated with less paper consumption than the normal print mode, a document reading unit configured to read documents in a document containing unit and to generate read images, a document detecting unit configured to detect documents in the document containing unit, a confirmation window displaying unit configured to display a confirmation window having a mode change button based on a detection result from the document detecting unit, and an image forming unit configured to form output images from the read images based on the print mode. The confirmation window displaying unit determines whether the confirmation window is to be displayed based on the print mode, and the print mode selecting unit selects the normal print mode in response to an input through the mode change button.

28 Claims, 22 Drawing Sheets

APPEARING PATTERN OF CONFIRMATION WINDOW

FIG. 1A MFP
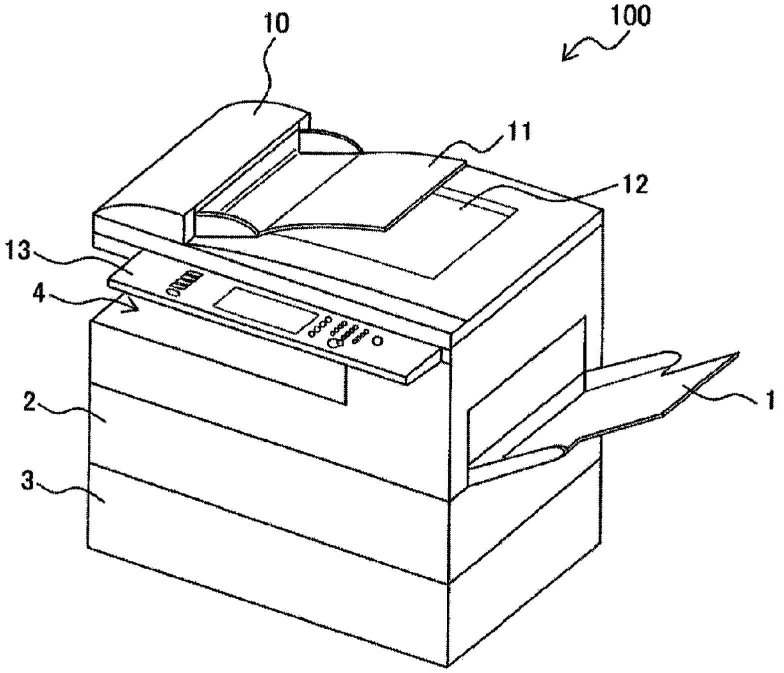
FIG. 1B CONTROL PANEL
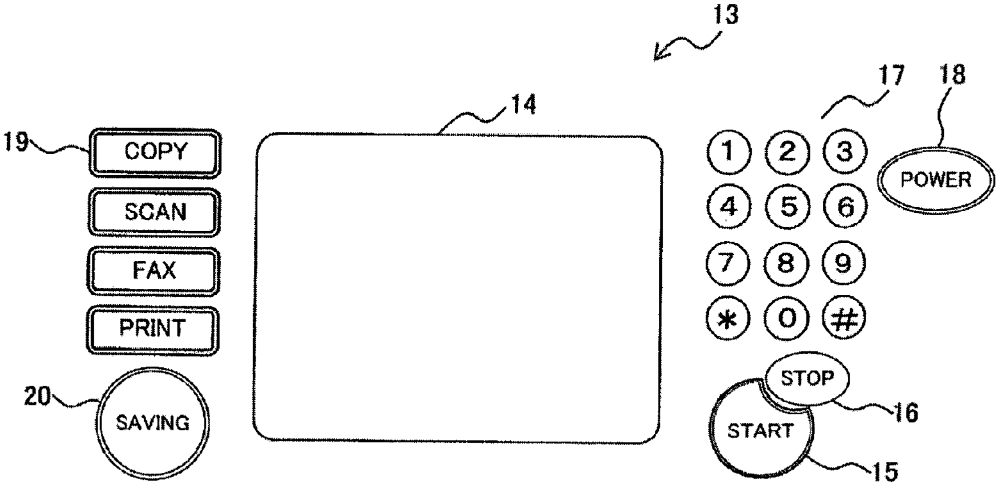

CONVENTIONAL EXAMPLE

FIG. 9

APPEARING PATTERN OF CONFIRMATION WINDOW

| NORMAL PRINT MODE | SAVING PRINT MODE |
|---|---|
| DOCUMENTS DETECTED → CONFIRMATION WINDOW NOT DISPLAYED | DOCUMENTS DETECTED → CONFIRMATION WINDOW DISPLAYED |

FIG. 13

APPEARING PATTERN OF CONFIRMATION WINDOW

| NORMAL PRINT MODE | SAVING PRINT MODE | |
|---|---|---|
| | THERE HAS BEEN DISPLAY HISTORY OF SETTING CHANGE WINDOW | THERE HAS BEEN NO DISPLAY HISTORY OF SETTING CHANGE WINDOW |
| DOCUMENTS DETECTED → CONFIRMATION WINDOW NOT DISPLAYED | DOCUMENTS DETECTED → CONFIRMATION WINDOW NOT DISPLAYED | DOCUMENTS DETECTED → CONFIRMATION WINDOW DISPLAYED |

FIG. 16

APPEARING PATTERN OF CONFIRMATION WINDOW

| NORMAL PRINT MODE | SAVING PRINT MODE | |
|---|---|---|
| | THERE HAS BEEN DISPLAY HISTORY OF SETTING CHANGE WINDOW | THERE HAS BEEN NO DISPLAY HISTORY OF SETTING CHANGE WINDOW |
| PRESS START KEY → CONFIRMATION WINDOW NOT DISPLAYED | PRESS START KEY → CONFIRMATION WINDOW NOT DISPLAYED | PRESS START KEY → CONFIRMATION WINDOW DISPLAYED |

DOCUMENT READING APPARATUS AND METHOD WITH SELECTION MODE

CROSS-REFERENCE TO RELATED APPLICATIONS

This application claims priority under 35 U.S.C. 119 to Japanese Patent Application No. 2010-108057, filed on May 10, 2010, which application is hereby incorporated by reference in its entirety.

BACKGROUND OF THE INVENTION

1. Field of the Invention

The present invention relates to an improvement of a document reading apparatus, more specifically, a document reading apparatus whose print mode may be selected between either a normal print mode or a saving print mode having print settings in which less paper is consumed than in the normal print mode. The document reading apparatus generates output images from read images based on the print mode. The present invention also relates to an improvement of a document reading method.

2. Description of the Related Art

Most conventional copying machines have an aggregate printing function which aggregates images read from plural pieces of documents and prints the aggregated images on a single piece of paper, and a double-sided printing function which prints read images composed of two pages respectively on both sides of paper. For example, these functions can be executed selectively.

The aggregate printing and the double-sided printing can save paper consumed for printing compared with normal printing, which prints read images composed of plural pages on one side of paper in order, one page per sheet of paper. Recently, in view of paper saving, printers including a saving print mode, which automatically selects print settings of the aggregate printing, the double-sided printing, and the like, and performs printing, have been suggested. However, with such a printer, for example, when a user wants to perform normal printing but is not aware of an existing saving print mode, or even if the user is aware of the saving print mode but forgets to deactivate the saving print mode, an undesirable printing would be performed against the user's intention, thereby resulting in a waste of paper consumption.

SUMMARY OF THE INVENTION

In order to overcome the problems described above, preferred embodiments of the present invention provide a document reading apparatus which can prevent undesirable printing from being executed, thereby saving paper. It is an object to provide a document reading apparatus which can prevent output images based on read images from being generated, especially while a user is not aware of the saving print mode. It is another object to provide a document reading apparatus which allows print settings to be changed easily when the user notices the saving print mode.

The problems which the present invention aims to overcome have been described above, and methods to solve the problems and the effects thereof will be described.

A document reading apparatus according to the first aspect of the present invention includes a print mode selecting unit configured to select either the normal print mode or the saving print mode as the print mode based on a user input, the normal print mode including predetermined print settings and the saving print mode including print settings associated with less paper consumption than the normal print mode, a document containing unit arranged to hold at least two pieces of documents, a document reading unit configured to read the documents in the document containing unit and to generate read images, a document detecting unit configured to detect the documents in the document containing unit, a confirmation window displaying unit configured to display a confirmation window having a mode change button based on a detection result from the document detecting unit, and an image forming unit configured to form output images from the read images based on the print mode. The confirmation window displaying unit determines whether or not the confirmation window is to be displayed based on the print mode, and the print mode selecting unit selects the normal print mode as the print mode in response to an input through the mode change button.

In the document reading apparatus, the confirmation window is displayed based on the detection result of the documents from the document containing unit. Since whether or not the confirmation window is to be displayed is determined based on the selected print mode, whether or not the document reading apparatus is in the saving print mode can be recognized through the display of the confirmation window when the documents are in the document containing unit. Accordingly, forming the output images from the read images without the user noticing the saving print mode can be prevented. Further, since the normal print mode may be selected in response to an input through the mode change button arranged on the confirmation window, the print mode can be changed easily when the user notices the saving print mode.

In a document reading apparatus according to the second aspect of the present invention, in addition to the above configuration, the confirmation window displaying unit does not display the confirmation window if the print mode is the normal print mode.

A document reading apparatus according to the third aspect of the present invention includes, in addition to the above configuration, a print setting change window displaying unit configured to display a print setting change window for changing the print settings based on an input selection of an item arranged on a menu window, and a display history storage unit configured to store a display history of the print setting change window. When the documents are detected by the document detecting unit, the confirmation window displaying unit determines whether or not the confirmation window is to be displayed based on the display history of the print setting change window prior to the detection of the documents.

In such a configuration, since the confirmation window is displayed based on the display history of the print setting change window displayed based on the input selection, whether or not the confirmation window is to be displayed can be determined according to the display history prior to the detection of the documents.

A document reading apparatus according to the fourth aspect of the present invention includes a print mode selecting unit configured to select either the normal print mode or the saving print as the print mode based on a user input, the normal print mode including the predetermined print settings and the saving print mode including the print settings associated with less paper consumption than the normal print mode, a document containing unit arranged to hold at least two pieces of documents, a document reading unit configured to read the documents in the document containing unit and to generate read images, a confirmation window displaying unit configured to display a confirmation window having a mode change button in response to a first start input for causing the document reading unit to start reading the documents, and an image forming unit configured to form output images from the read images based on the print mode. The confirmation window displaying unit determines whether or not the confirmation window is to be displayed based on the print mode. The document reading unit starts reading the documents in response to the first start input if the print mode is the normal print mode, and starts reading the documents in response to a second start input when the confirmation window is being displayed if the print mode is the saving print mode. The print mode selecting unit selects the normal print mode as the print mode based on an input through the mode change button.

In the document reading apparatus, the reading of the documents is started in response to the first start input if the print mode is the normal print mode, and is started in response to the second start input when the confirmation window is being displayed if the print mode is the saving print mode. Since whether or not the confirmation window is to be displayed is determined based on the selected print mode, whether or not the document reading apparatus is in the saving print mode can be recognized through the display of the confirmation window upon the first start input. Accordingly, forming the output images from the read images without the user noticing the saving print mode can be prevented. Further, since the normal print mode may be selected based on the input through the mode change button arranged on the confirmation window, the print mode can be changed easily when the user notices the saving print mode.

In a document reading apparatus according to the fifth aspect of the present invention, in addition to the above configuration, the confirmation window displaying unit does not display the confirmation window if the print mode is the normal print mode. In such a configuration, it is possible to prevent unnecessary operations from occurring during the normal print mode.

A document reading apparatus according to the sixth aspect of the present invention includes, in addition to the above configuration, a print setting change window displaying unit configured to display a print setting change window for changing the print settings based on an input selection of an item arranged on a menu window, and the display history storage unit configured to store a display history of the print setting change window. When the first start input is received, the confirmation window displaying unit determines whether or not the confirmation window is to be displayed based on the display history of the print setting change window prior to the first start input.

In such a configuration, since the confirmation window is displayed based on the display history of the print setting change window, which is displayed based on the input selection, whether or not the confirmation window is to be displayed can be determined according to the display history prior to the first start input.

In a document reading apparatus according to the seventh aspect of the present invention, in addition to the above configuration, the confirmation window displaying unit displays the confirmation window including a message indicating that the print mode is the saving print mode. In such a configuration, it is possible to notify the user of the saving print mode through the display of the confirmation window.

According to the document reading apparatus of the present invention, whether or not the document reading apparatus is in the saving print mode can be recognized through the display of the confirmation window when the documents are placed in the document containing unit. Further, whether or not the document reading apparatus is in the saving print mode can be recognized through the display of the confirmation window upon the first start input. Consequently, forming the output images from the read images without the user noticing the saving print mode can be prevented, thereby preventing undesirable printing so as to save paper consumption. Further, since the normal print mode may be selected in response to an input through the mode change button arranged on the confirmation window, the print mode can be changed easily when the user notices the saving print mode.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 1 is a drawing illustrating an example of a configuration of a document reading apparatus according to Embodiment 1 of the present invention, and illustrates a MFP 100 as an example of the document reading apparatus.

FIG. 9 illustrates an example of operations in the MFP 100 of FIG. 1 during printing, and illustrates an appearing pattern indicating whether or not a confirmation window 25 is displayed.

FIG. 13 illustrates an example of operations in the MFP 100 of FIG. 12 during printing, and illustrates an appearing pattern indicating whether or not the confirmation window 25 is displayed.

FIG. 16 illustrates an example of operations in the MFP 100 of FIG. 15 during printing, and illustrates an appearing pattern indicating whether or not the confirmation window 25 is displayed.

DETAILED DESCRIPTION OF PREFERRED EMBODIMENTS

Embodiment 1

MFP

Figure 2:
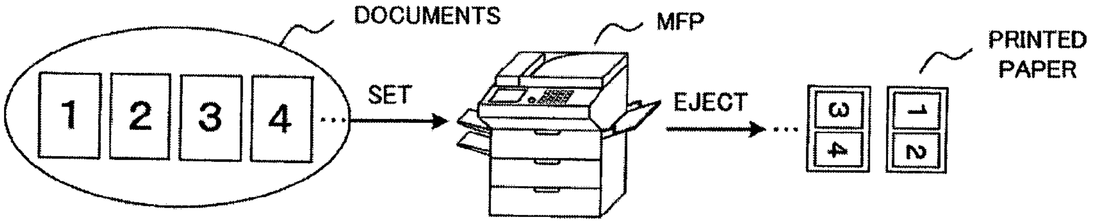
FIG. 2 is a diagram illustrating operations in a conventional MFP during copying.

FIGS. 1*a* and 1*b* are drawings illustrating an example of a configuration of a document reading apparatus according to Embodiment 1 of the present invention, and illustrate a MFP 100 as an example of the document reading apparatus. FIG. 1*a* illustrates the entire view of the MFP 100, and FIG. 1*b* illustrates a control panel 13 of the MFP 100.

The MFP (multifunction peripheral) 100 is an image processing apparatus including a scanner function, a printer function, a facsimile function, a copying function, and an e-mail transmit-receive function. The MFP 100 can perform these functions selectively. The MFP 100 includes an ADF unit 10, the control panel 13, a manual tray 1, paper containing units 2, 3, and an eject tray 4 for paper. The MFP 100 can print, on paper, images read from documents based on predetermined print settings. The paper here is printing paper on which the read images are to be printed.

The ADF unit 10 includes an ADF (automatic document feeder) and a platen cover. A feed tray 11 and an eject tray 12 for documents are arranged on the platen cover. In the ADF unit 10, documents placed in the feed tray 11 are transported continuously one by one to a reading unit, and the documents which have been read by the reading unit are then ejected to the eject tray 12.

The feed tray 11 is a document containing unit that holds plural pieces of documents before they are read. By contrast, the eject tray 12 is a document containing unit that holds the documents which have been read, and is arranged under the feed tray 11.

The platen cover is a cover that presses documents placed on a document table made of transparent glass. The manual tray 1 and the paper containing units 2, 3 are containing units that hold paper before the paper is used for printed. The eject tray 4 is a containing unit that holds the paper after printing.

The control panel 13 includes a display 14, a start key 15, a stop key 16, a numeric keypad 17, a power switch 18, a function select key 19, a saving mode select key 20, and the like.

The display 14 is a display unit that displays a menu window and the like, and displays the state of operations, details of a process and the like. A touch panel is arranged on the surface of the display 14 for detecting manipulations through the surface of the display 14. An input process corresponding to the position of the manipulation is executed based on the detection of the operated position. The start key 15 is an operation key for starting a process such as document transportation, and the stop key 16 is an operation key for canceling the process.

The function select key 19 is an operation key for selecting a function to be performed. In this case, a copy key, a scan key, a facsimile transmit key, and a print key are arranged as the function select key 19. The saving mode select key 20 is an operation key for selecting the print mode to be either the normal print mode or the saving print mode and, for example, can change the print mode every time it is pressed.

While the normal print mode is a print mode including predetermined print settings, the saving print mode is a print mode including print settings in which less paper is consumed than the normal print mode. The paper saving printing could be the aggregate printing, the double-sided printing, the aggregate and double-sided printing, and the like.

When the copy function is selected, the document may be read through ADF reading using an ADF or through FBS (flat bed scanner) reading using the document table. The ADF reading reads the document while transporting the documents. On the other hand, the FBS reading reads the document based on the movement of a reading device while holding the document still on the document table.

<Comparison with Conventional Examples>

FIG. 2 is a diagram illustrating operations of a conventional MFP during copying, and illustrates the aggregate printing that aggregates read images composed of two pages and prints the aggregated images on a single piece of paper. The documents 1, 2, 3, 4 are held in the feed tray and are read in order when the start key is pressed. The read images are printed onto the paper and then the paper is ejected to the eject tray after printing.

In this case, the read images composed of two pages read from the documents 1 and 2 are printed onto a first piece of paper, and the read images composed of two pages read from the documents 3 and 4 are printed onto a second piece of paper.

In the conventional MFP, upon having plural pieces of documents in the feed tray and pressing the start key, the document reading is started so as to perform the aggregate printing. Consequently, when the user presses the start key without being aware that the aggregate printing is selected, the printing would be performed against the user's intention, thereby resulting in a waste of paper consumption.

Figure 3:
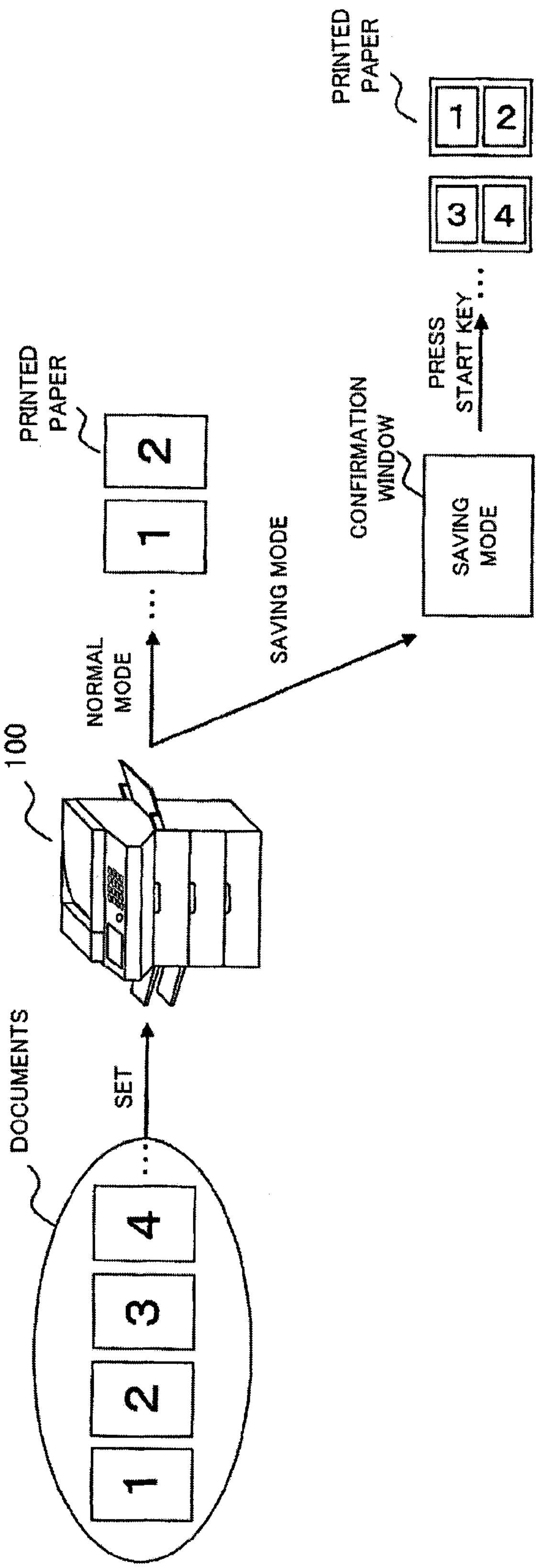
FIG. 3 is a diagram illustrating an example of operations in the MFP 100 of FIG. 1 during copying, and illustrates an execution of a printing process according to the print mode.

FIG. 3 is a diagram illustrating an example of operations in the MFP 100 of FIG. 1 during copying, and illustrates an execution of a printing process according to the print mode. If the print mode is the normal print mode, upon having plural pieces of documents in the feed tray 11 and pressing the start key 15, the document reading is started so as to perform the normal printing.

On the other hand, if the print mode is the saving print mode, the documents in the feed tray 11 are detected and the confirmation window for calling the facts to user's attention is displayed on the display 14. By pressing the start key 15 when the confirmation window is displayed, the paper saving printing is performed.

In other words, if the print mode is the normal print mode, by pressing the start key 15 after having the documents, the document reading and the printing process are started. On the other hand, if the print mode is the saving print mode, the confirmation window is displayed when the documents are placed, and then the document reading and the printing process are started by pressing the start key 15 when the confirmation window is displayed.

Since whether or not the confirmation window is displayed is determined based on the selected print mode, whether or not the saving print mode is selected can be recognized with the display of the confirmation window when the documents are placed in the feed tray 11. Accordingly, printing the read images onto the paper without in the user being aware of the saving print mode can be prevented.

<Print Settings>

Figure 4A:
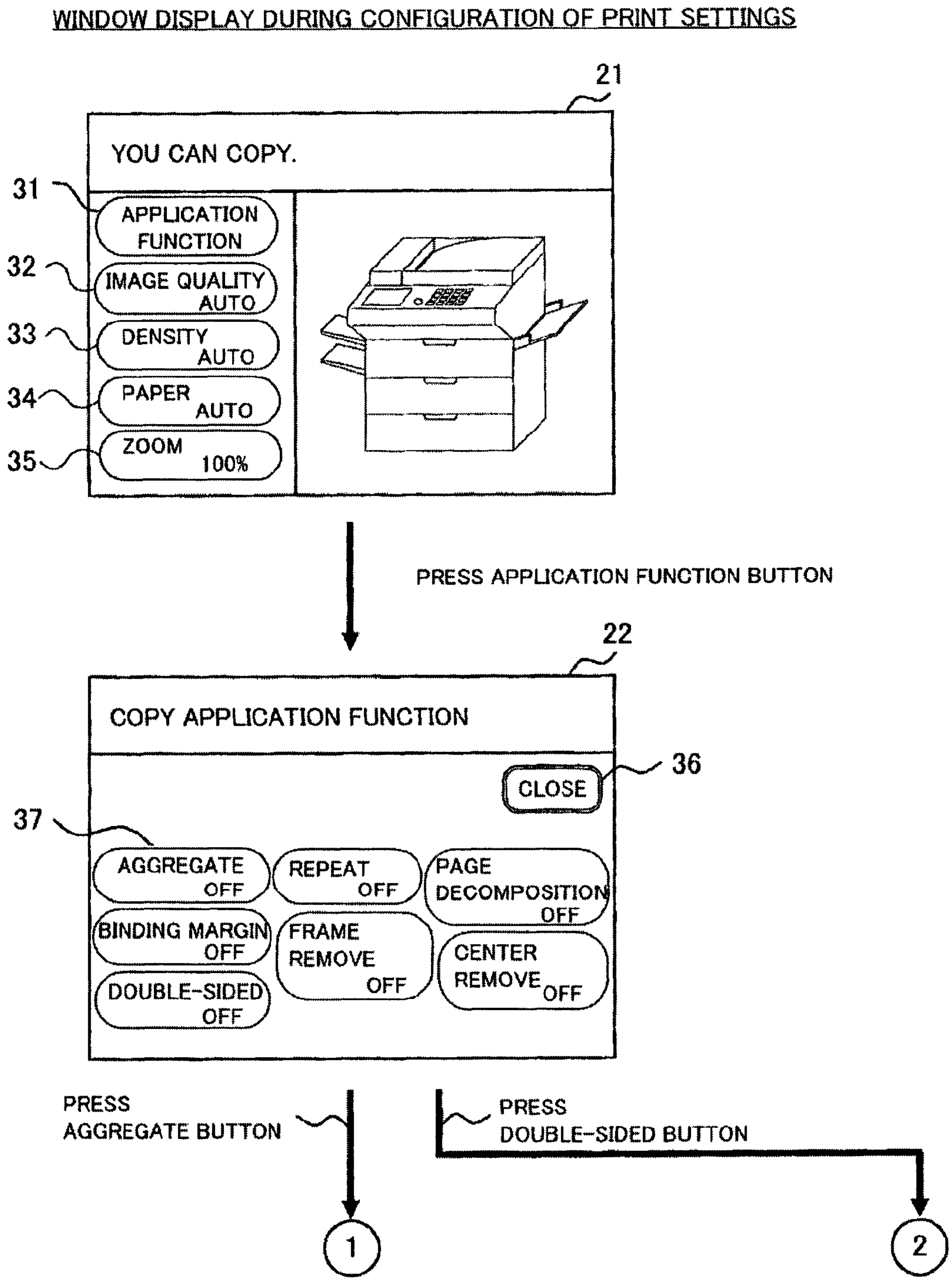
FIGS. 4*a* and 4*b* illustrate an example of operations in the MFP 100 of FIG. 1 during copying, and illustrate the window display on a display 14 during configuration of the print settings.
Figure 4B:
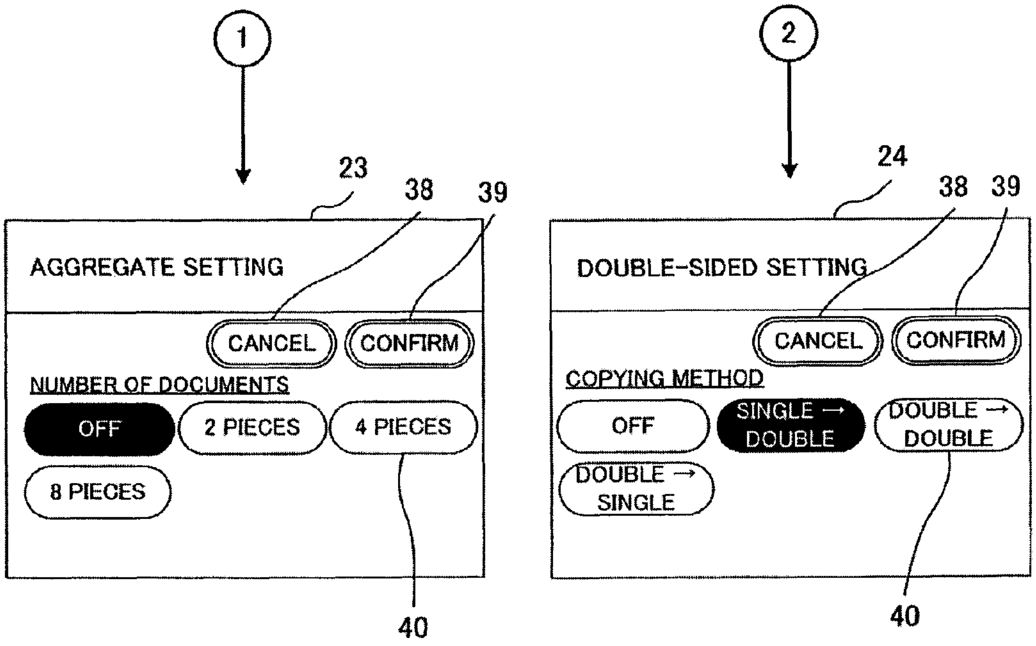

FIGS. 4A and 4B are drawings illustrating an example of operations in the MFP 100 of FIG. 1 during copying, and illustrate the window display on the display 14 during the configuration of the print settings. In the MFP 100, a menu window corresponding to a function selected through the function select key 19 is displayed on the display 14, as an initial window or a standby window.

The menu window 21 displayed when the copy function is selected includes an application function button 31, an image quality button 32, a density button 33, a paper button 34 and a zoom button 35. These buttons 31 through 35 are item selection buttons for selecting a menu item for the print settings.

The application function button 31 is an operation icon for changing the print settings which are preliminarily determined as application functions, and a submenu window 22 is displayed by pressing the application function button 31. The image quality button 32 is an operation icon for changing the quality of printing, and the density button 33 is an operation icon for changing the density of the printing. Further, the paper button 34 is an operation icon for changing paper settings such as paper size and paper orientation, and the zoom button 35 is an operation icon for changing the magnification at the time of printing.

On the buttons 32 through 35, details of the current settings are displayed through character strings. For example, the character string "automatic" is displayed on the image quality button 32, indicating that the selected print settings would determine the image quality automatically according to the read images The submenu window 22 is a print setting change window for changing the print settings, and is displayed on the display 14 based on an input through the application function button 31. The submenu window 22 includes a close button 36 and item selection buttons 37. The close button 36 is an operation icon for ending a process of changing the print settings and returning to the original menu window 21.

The item selection buttons 37 are operation icons for selecting a print setting item for the copying, and the print settings can be changed by pressing the item selection buttons 37. Print setting items that are selectable include "aggregate", "repeat", "page decomposition", "binding margin", "frame remove", "center remove", and "double-sided".

The "repeat" is a setting item for repeat printing, which prints the read images composed of one page repeatedly, on plural pieces of paper. The "page decomposition" is a print setting for page decomposition printing, which decomposes read images composed of one page into images composed of plural pages and prints each of the decomposed pages on paper. The "binding margin" is a setting item for changing the binding margin when printing. The "frame remove" is a setting item for removing an outer frame when printing. The "center remove" is a setting item for removing a center part when printing.

The current setting details are displayed in character strings on the item selection buttons 37. In this case, the character string "off" is displayed on each of the buttons 37, indicating that the print setting assigned thereto is not selected.

An aggregate setting window 23 is the print setting change window for changing the print settings for the aggregate printing, and is displayed on the display 14 by pressing the "aggregate" button on the submenu window 22. The aggregate setting window 23 includes a cancel button 38, a confirm button 39, and item selection buttons 40.

The cancel button 38 is an operation icon for invalidating information of the print settings changed during the time between the display of the aggregate setting window 23 and the input through the cancel button 38, and returning to the original submenu window 22. The confirm button 39 is an operation icon for confirming the print settings and returning to the original submenu window 22.

The item selection buttons 40 are operation icons for selecting predetermined print settings. On the aggregate setting window 23, "off" (not selected), "2 pieces", "4 pieces" and "8 pieces" are displayed as selectable print settings. The number of documents to be aggregated onto one piece of paper can be changed through the item selection buttons 40.

The print setting "2 pieces" is a setting for printing read images composed of two pages on one side of a single piece of paper, "4 pieces" is a setting for printing read images composed of four pages on one side of a single piece of paper, and "8 pieces" is a setting for printing read images composed of eight pages on one side of a single piece of paper.

A double-sided setting window 24 is the print setting change window for changing the print settings for the double-sided printing, and is displayed on the display 14 by pressing the "double-sided" button on the submenu window 22. The double-sided setting window 24 includes a cancel button 38, a confirm button 39 and item selection buttons 40.

The cancel button 38 is an operation icon for invalidating information of the print settings changed during the time between the display of the double-sided setting window 24 and the input through the cancel button 38, and returning to the original submenu window 22.

On the double-sided setting window 24, "off" (not selected), "single-sided to double-sided", "double-sided to double-sided", and "double-sided to single-sided" are displayed as selectable print settings. The copying method can be changed through the item selection buttons 40.

The print setting "single-sided to double-sided" is a setting for printing images composed of two pages read from a single side of two pieces of documents on both sides of a single piece of paper. The "double-sided to double-sided" is a setting for printing images composed of two pages read from both sides of a document on both sides of paper. The "double-sided to single-sided" is a setting for printing images composed of two pages read from both sides of a document respectively on a single side of two pieces of paper.

Since the current setting details are displayed on the item selection buttons 37, whether or not the print settings for the paper saving printing, such as the aggregate printing and the double-sided printing, are selected can be recognized through the display of the submenu 22.

<Copying Process in the Saving Mode>

Figure 5A:
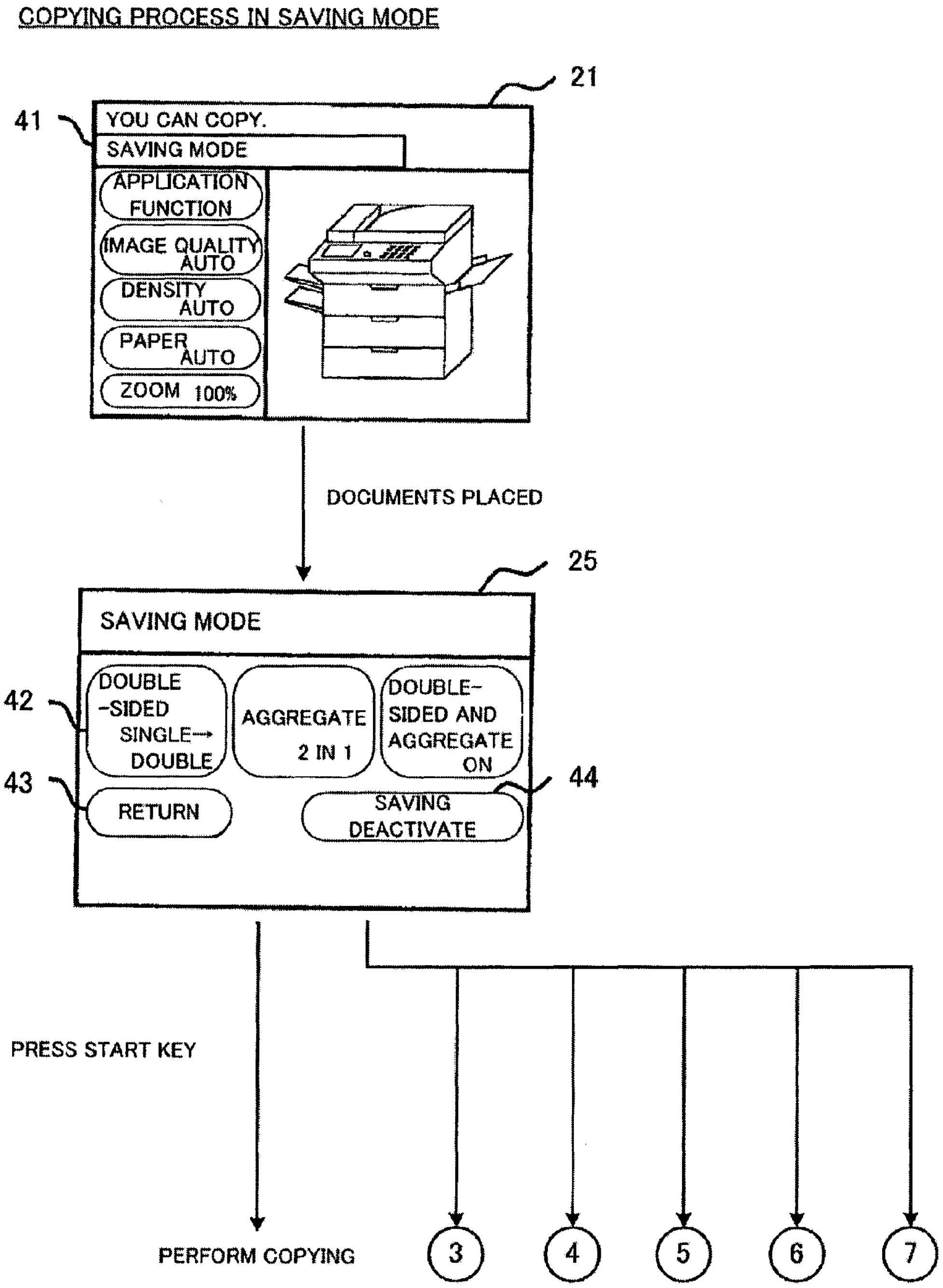
FIGS. 5*a*, 5*b*, and 5*c* illustrate an example of a copying process in the MFP 100 of FIG. 1 in the saving print mode, and illustrate a case when documents are placed when a menu window 21 is being displayed.
Figure 5B:
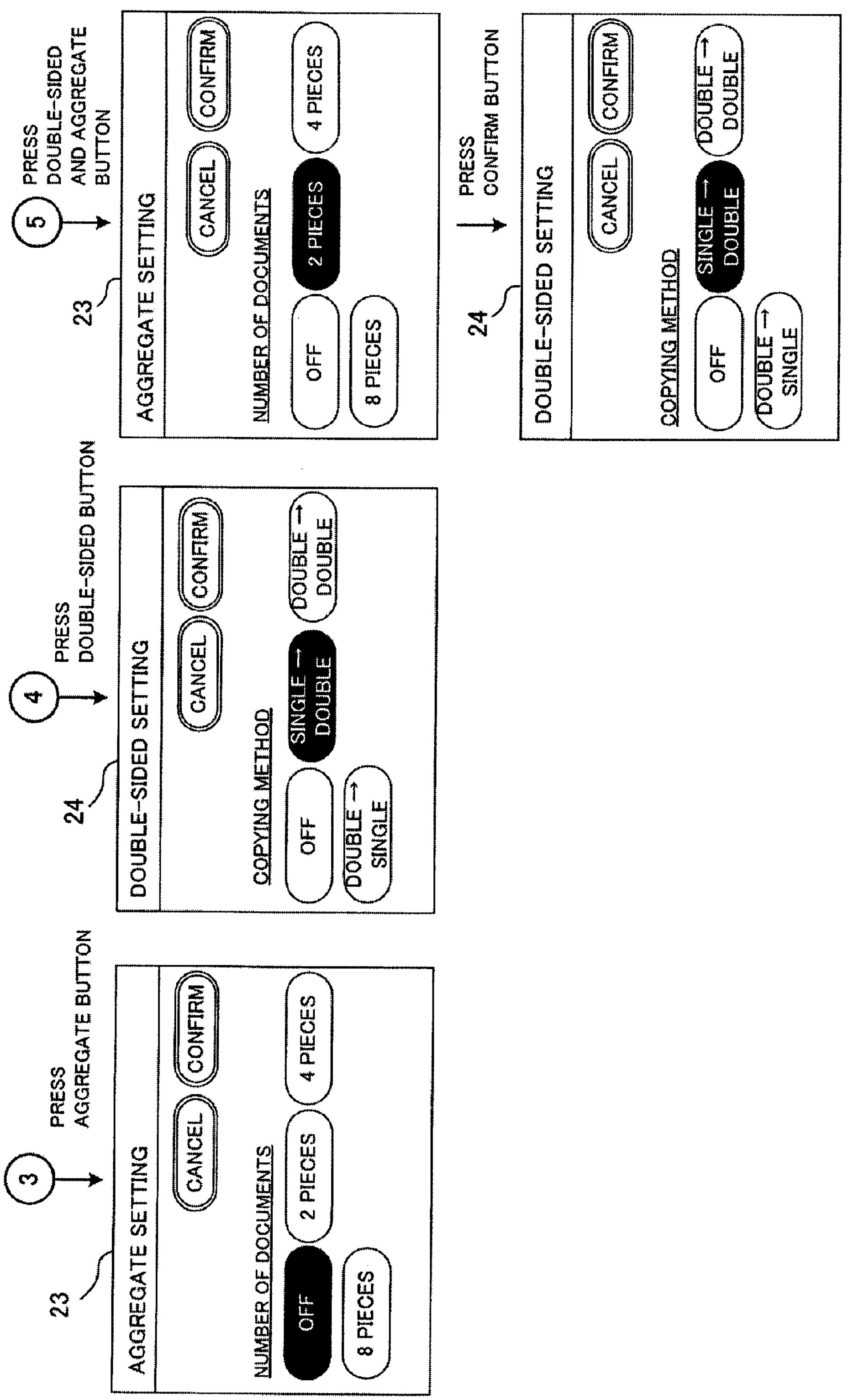
Figure 5C:
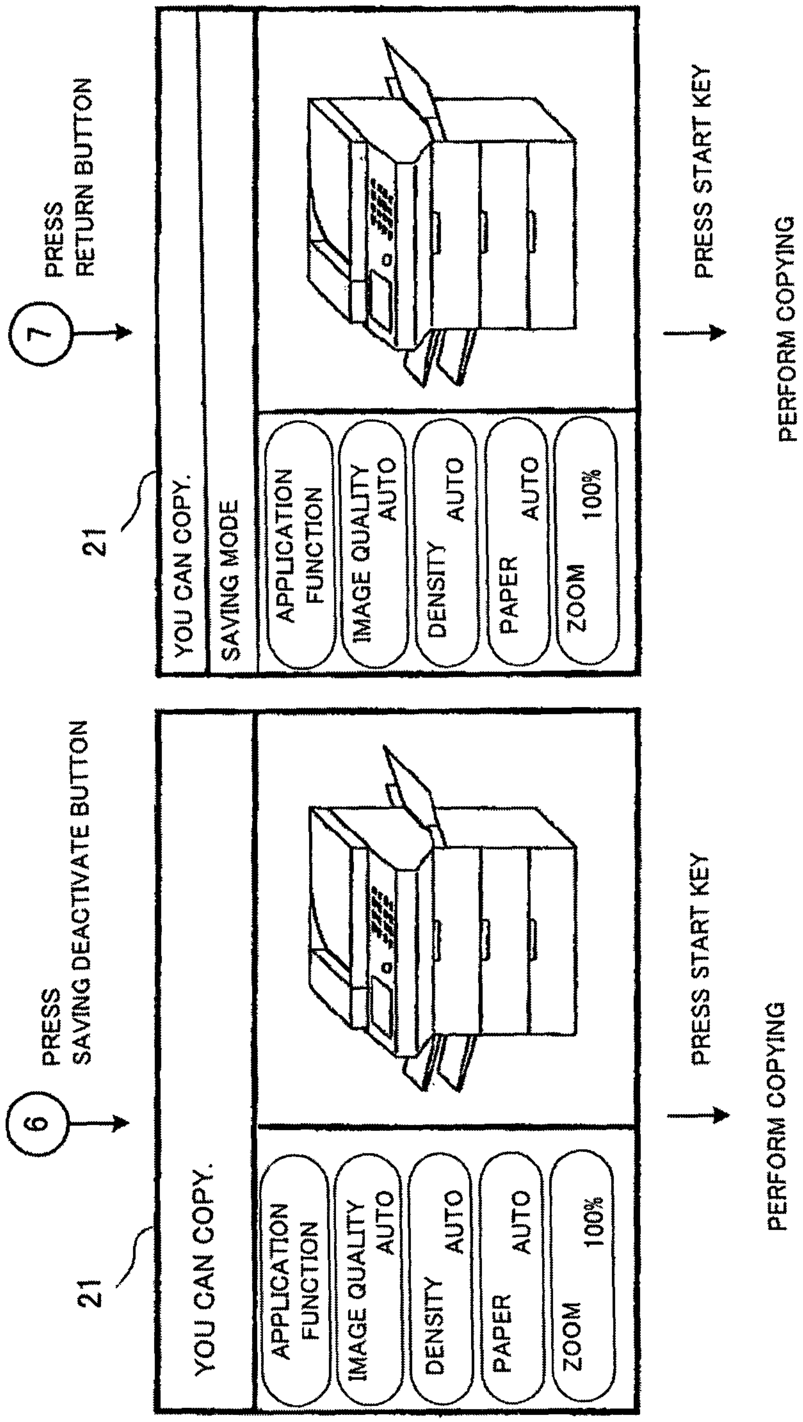

FIGS. 5*a*, 5*b*, and 5*c* illustrate an example of a copying process in the MFP 100 of FIG. 1 in the saving print mode, and illustrate a case when documents are placed in when the menu window 21 is being displayed. If the saving print mode is selected, a message 41 indicating the saving print mode is displayed on the menu window 21. The message 41 is not displayed while the MFP 100 is in the normal print mode.

When placing documents in the feed tray 11 during the saving print mode, the documents in the feed tray 11 are detected and the confirmation window 25 is then displayed on the display 14. The confirmation window 25 is an announcement window that notifies the user of the saving print mode, and is displayed based on the detection of the documents.

The confirmation window 25 includes item selection buttons 42, a return button 43, and a saving deactivate button 44, and displays a message indicating the saving print mode. The return button 43 is an operation icon for closing the confirmation window 25 and returning to the original menu window 21. The saving deactivate button 44 is a mode change button for deactivating the saving print mode and switching the mode to the normal print mode. The print settings for the saving printing can be deactivated by pressing the saving deactivate button 44.

The item selection buttons 42 are operation icons for changing the print settings for the saving printing, and the print settings assigned thereto can be changed through the item selection buttons 42. Setting items for the paper saving printing include "double-sided", "aggregate", and "double-sided and aggregate", and one of these can be selected. On each of the item setting buttons 42, the current setting details are displayed in character strings.

If the start key 15 is pressed while such a confirmation window 25 is being displayed, the document reading and the printing processes are started. By contrast, if the "aggregate" button on the confirmation window 25 is pressed, the aggregate setting window is displayed.

The aggregate settings can be changed through the item selection buttons 40 on the aggregate setting window 23. Further, by pressing the cancel button 38, information of the print settings changed during the time between the display of the aggregate setting window 23 and the input through the cancel button 38 will be invalidated, and the original confirmation window 25 can be returned to. Furthermore, by pressing the confirm button 39, the print settings can be confirmed, and the original confirmation window 25 can be returned to.

If the "double-sided" button on the confirmation window 25 is pressed, the double-sided setting window 24 is displayed. By pressing the item selection buttons 40 on the double-sided setting window 24, the double-sided settings can be changed. Further, by pressing the cancel button 38, information of the print settings changed during the time between the display of the double-sided setting window 24 and the input through the cancel button 38 will be invalidated, and the original confirmation window 25 can be returned to. Furthermore, by pressing the confirm button 39, the print settings can be confirmed, and the original confirmation window can be returned to.

If the "double-sided and aggregate" button is pressed, the aggregate setting window 23 is displayed so that the aggregate settings can be changed. By pressing the confirm button 39 on the aggregate setting window 23, the double-sided setting window 24 is then displayed so that the double-sided settings can be changed.

If the saving deactivate button 44 on the confirmation window 25 is pressed, the saving print settings are deactivated and the menu window 21 is returned to. That is, the print mode changes to the normal print mode in which the aggregate print settings and the double-sided print settings are not selected. If the start key is then pressed after the menu window 21 has been returned to, the document reading and the printing processes are started.

If the return button 43 on the confirmation window 25 is pressed, the original menu window 21 is returned to. If the start key 15 is then pressed after the original menu window 21 has been retuned to, the document reading and the printing processes are started.

<Mail Transmitting Process in the Saving Mode>

Figure 6A:
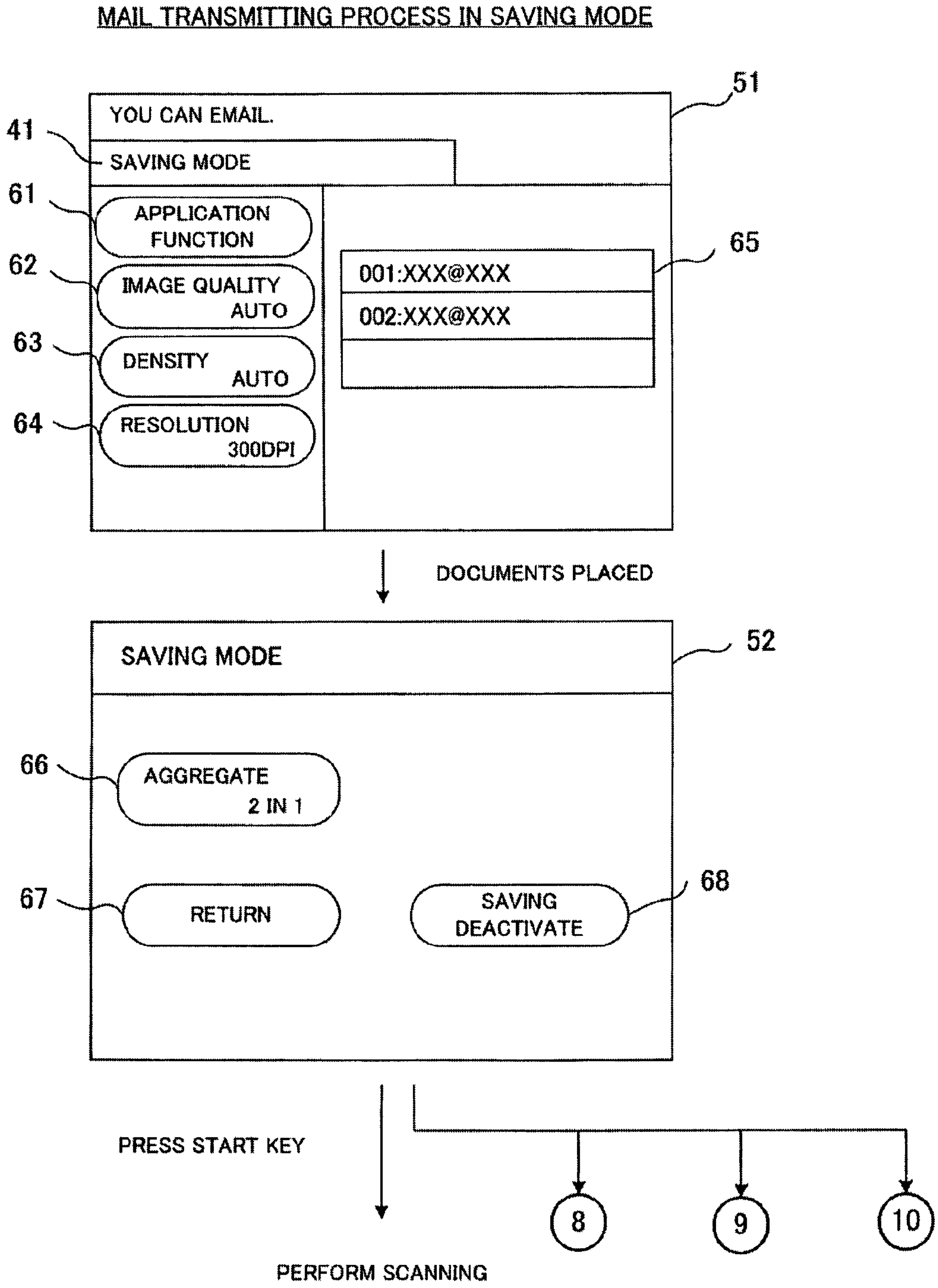
FIGS. 6*a* and 6*b* illustrate an example of a mail transmitting process in the MFP 100 of FIG. 1 in the saving print mode.
Figure 6B:
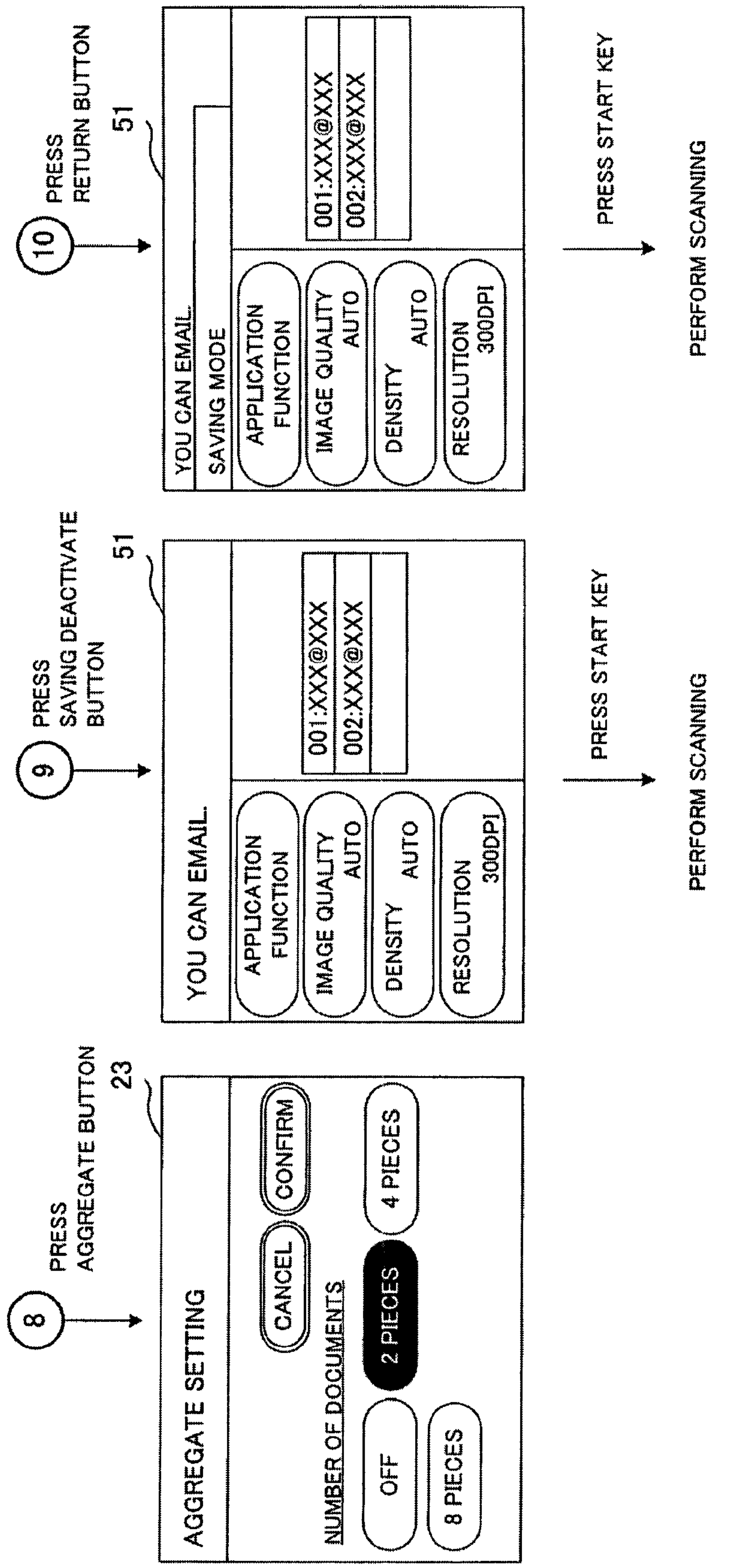

FIGS. 6*a* and 6*b* illustrate an example of a mail transmitting process in the MFP 100 of FIG. 1 in the saving mode. If a mail transmit function is selected, a menu window 51 is displayed on the display 14. The menu window 51 includes an application function button 61, an image quality button 62, a density button 63, and a resolution button 64, and displays address information 65 indicating e-mail destinations and the like. The buttons 61 through 64 are item selection buttons for selecting a menu item for e-mail transmit settings.

When placing documents in the feed tray 11 during the saving print mode, the documents in the feed tray 11 are detected and the confirmation window 52 is then displayed on the display 14. The confirmation window 52 includes an item selection button 66, a return button 67, and a saving deactivate button 68, and displays a message indicating the saving print mode.

The item selection button 66 is an operation icon for changing the print settings for the paper saving printing. Through the item selection button 66, the print setting assigned thereto can be changed. "Aggregate" is included as the setting item for the paper saving printing, and the current setting details are displayed in character strings on the item selection button 66.

If the start key 15 is pressed when the confirmation window 52 is being displayed, the document reading process and a process of transmitting the read images as an e-mail are started. By contrast, if the "aggregate" button on the confirmation window 52 is pressed, the aggregate setting window 23 is displayed.

By pressing the item selection buttons 40 on the aggregate setting window 23, the aggregate settings can be changed. Further, by pressing the cancel button 38, information of the print settings changed during the time between the display of the aggregate setting window 23 and the input through the cancel button 38 will be invalidated, and the original confirmation window 52 can be returned to. Furthermore, by pressing the confirm button 39, the print settings can be confirmed, and the original confirmation window 52 can be returned to.

If the saving deactivate button 68 on the confirmation window 52 is pressed, the saving print settings are deactivated and the menu window 51 is returned to. That is, the print mode changes to the normal print mode in which the aggregate print settings are not selected in this case. If the start key 15 is then pressed after the menu window 51 has been returned to, the document reading process and the process of transmitting the read images as an e-mail are started.

If the return button 67 on the confirmation window 52 is pressed, the original menu window 51 is returned to. If the start key 15 is then pressed after the menu window 51 has been returned to, the document reading process and the process of transmitting the read images as an e-mail are started.

<Facsimile Transmitting Process>

Figure 7A:
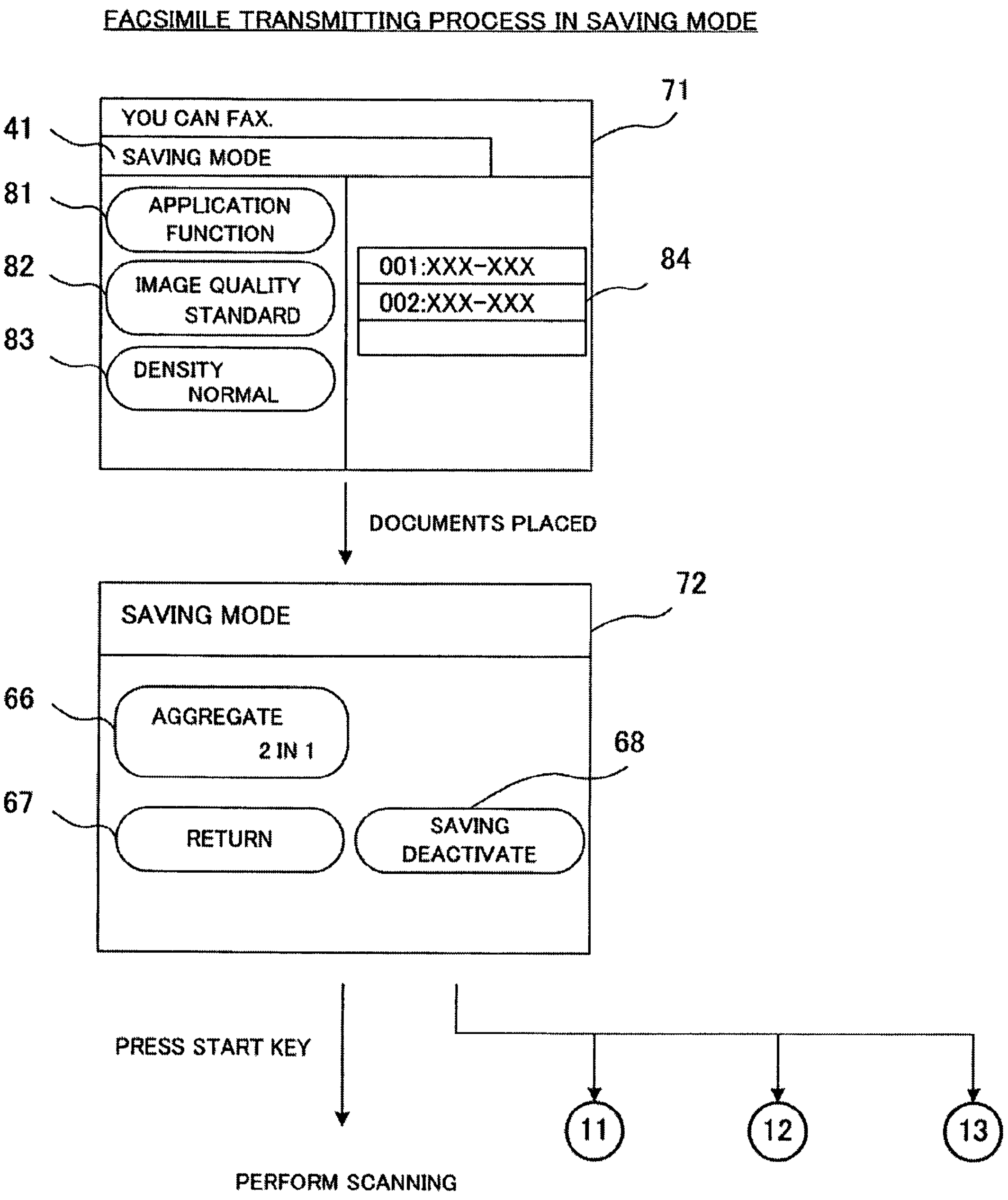
FIGS. 7*a* and 7*b* illustrate an example of a facsimile transmitting process in the MFP 100 of FIG. 1 in the saving print mode.
Figure 7B:
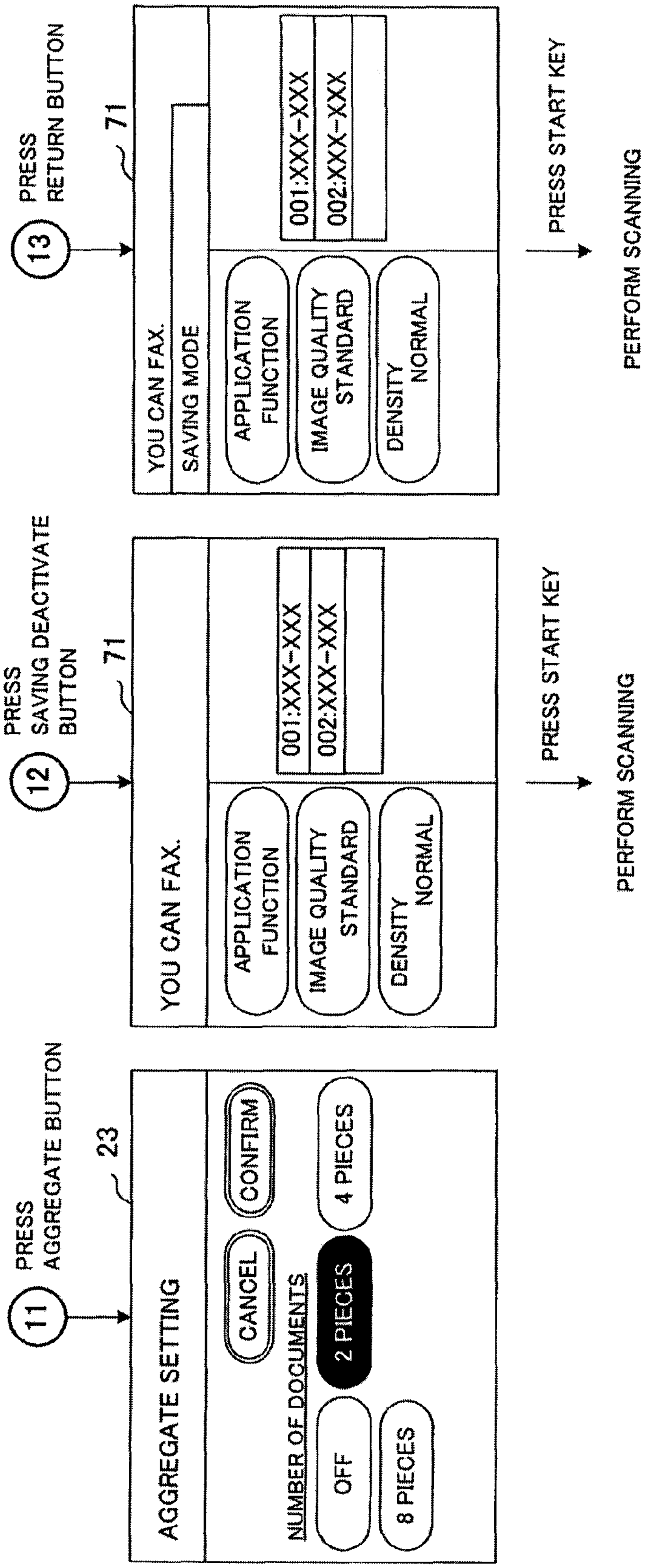

FIGS. 7*a* and 7*b* illustrate an example of a facsimile transmitting process of the MFP 100 of FIG. 1 in the saving mode. If a facsimile transmit function is selected, a menu window 71 is displayed on the display 14. The menu window 71 includes an application function button 81, an image quality button 82, and a density button 83, and displays number information 84 indicating facsimile destinations and the like. The buttons 81 through 83 are item selection buttons for selecting a menu item for facsimile transmit settings.

When placing documents in the feed tray 11 during the saving print mode, the documents in the feed tray 11 are detected and a confirmation window 72 is then displayed on the display 14. The confirmation window 72 includes item selection button 66, a return button 67, and a saving deactivate button 68, and displays a message indicating the saving print mode.

If the start key 15 is pressed when the confirmation window 72 is being displayed, the document reading process and the process of transmitting the read images by facsimile are started. By contrast, if the "aggregate" button on the confirmation window 72 is pressed, the aggregate setting window 23 is displayed.

By pressing the item selection buttons 40 on the aggregate setting window 23, the aggregate settings can be changed.

Further, by pressing the cancel button 38, information of the print settings changed during the time between the display of the aggregate setting window 23 and the input through the cancel button 38 will be invalidated, and the original confirmation window 72 can be returned to. Furthermore, by pressing the confirm button 39, the print settings can be confirmed, and the original confirmation window 72 can be returned to.

If the saving deactivate button 68 on the confirmation window 72 is pressed, the saving print settings are deactivated and the menu window 71 is then returned to. That is, the print mode changes to the normal print mode in which the aggregate print settings are not selected in this case. If the start key 15 is then pressed after the menu window 71 has been returned to, the document reading process and the process of transmitting the read images by facsimile are started.

If the return button 67 on the confirmation window 72 is pressed, the original menu window 71 is returned to. If the start key 15 is then pressed after the menu window 71 has been returned to, the document reading process and the process of transmitting the read images by facsimile are started.

Figure 8:
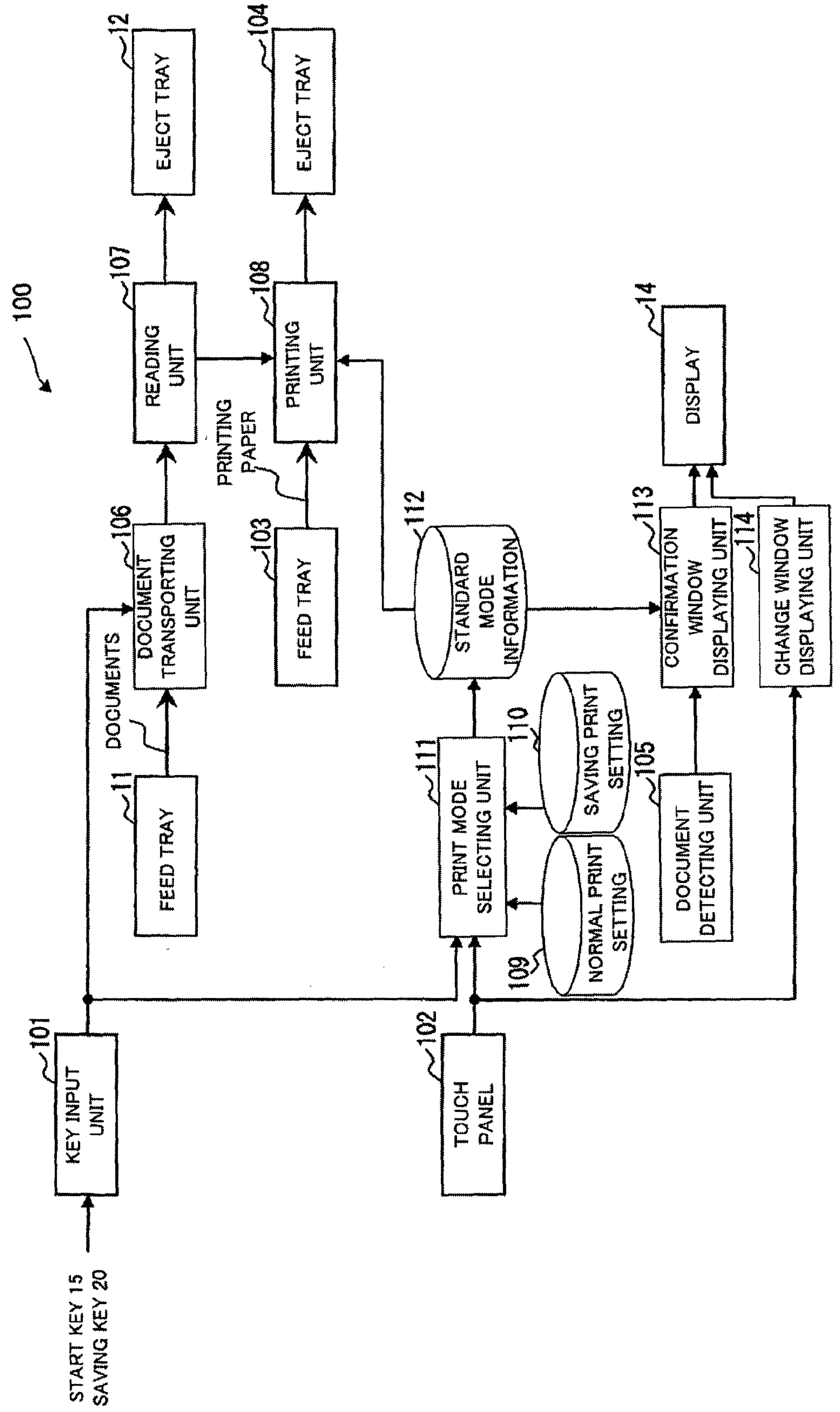
FIG. 8 is a block diagram illustrating an example of a configuration of the MFP 100 of FIG. 1, and illustrates an example of a functional configuration in the MFP 100.

FIG. 8 is a block diagram illustrating an example of a configuration of the MFP 100 of FIG. 1, and illustrates an example of a functional configuration in the MFP 100 in which a copy function is selected. The MFP 100 includes feed trays 11, 103, eject trays 12, 104, the display 14, a key input unit 101, a touch panel 102, a document detecting unit 105, a document transporting unit 106, a reading unit 107, a printing unit 108, a normal print setting storage unit 109, a saving print setting storage unit 110, a print mode selecting unit 111, a standard mode information storage unit 112, a confirmation window displaying unit 113, and a change window displaying unit 114.

The key input unit generates a predetermined key input signal based on an input through the start key 15 or the saving mode select key 20, and transmits the generated signal to the document transporting unit 106 and the print mode selecting unit 111. The document transporting unit 106 withdraws documents from the feed tray 11 one by one and transports the documents to the reading unit 107 in order. The document transportation is started in response to an input through the start key 15. The reading unit 107 reads the documents optically, generates the read images, and transmits the read images to the printing unit 108.

The feed tray 103 is a paper containing unit that holds a plurality of paper before printing. The eject tray 104 is a containing unit that holds the paper after printing. The printing unit 108 is an image forming unit that prints the images read by the reading unit 107 onto the paper.

The touch panel 102 detects manipulations received by the surface of the display 14, generates a predetermined input signal corresponding to the manipulation position, and transmits the input signal to the print mode selecting unit 111 and the change window displaying unit 114. The print mode selecting unit 111 selects the print mode, which is either the normal print mode or the paper saving print mode, based on the key input signal from the key input unit 101, and writes the selected print mode into the standard mode information storage unit 112 as standard mode information.

The normal print mode is the print mode including predetermined print settings, and the printing process associated therewith is executed based on setting data stored in the normal print setting storage unit 109. By contrast, the saving print mode is the print mode including print settings in which less paper is consumed than in the normal print mode, and the printing process associated therewith is executed based on setting data stored in the saving print setting storage unit 110.

Print settings for the paper saving printing include the aggregate printing and the double-sided printing. Each setting data of the normal printing and the paper saving printing is preliminarily registered based on user inputs. The printing unit 108 performs a printing process based on the standard mode information in the standard mode information storage unit 112.

The document detecting unit 105 detects documents in the feed tray 11 and transmits the detection result to the confirmation window displaying unit 113. The confirmation window displaying unit 113 displays the confirmation window 25 on the display 14 based on the detection result received from the document detecting unit 105. The confirmation window 25 is an announcement window that notifies the user that the MFP 100 is in the saving print mode, and is displayed at the time when the documents are in the feed tray 11. In other words, the confirmation window 25 is displayed when the state of the feed tray 11 changes from having no documents to having documents.

The confirmation window displaying unit 113 determines whether or not the confirmation window 25 is to be displayed based on the standard mode information. That is, the confirmation window displaying unit 113 displays the confirmation window 25 based on the detection result of the documents when the MFP 100 is in the saving print mode, and does not display the confirmation window 25 even when the documents are detected by the document detecting unit 105 when the MFP 100 is in the normal print mode.

The print mode selecting unit 111 selects the normal print mode based on an input through the saving deactivate button 44 on the confirmation window 25. That is, if the saving deactivate button 44 is pressed, the saving print mode is deactivated and the print mode changes to the normal print mode.

The change window displaying unit 114 displays the submenu window 22 based on an input through the application function button 31 on the menu window 21. Further, the change window displaying unit 114 displays the aggregate setting window 23 or the double-sided setting window 24 based on an input through the item selection buttons 37 on the submenu window 22. Furthermore, the change window displaying unit 114 displays the aggregate setting window 23 or the double-sided setting window 24 based on an input through the item selection button 42 on the confirmation window 25. The submenu window 22, the aggregate setting window 23, and the double-sided setting window 24 are all print setting change windows for changing the print settings.

<Appearing Pattern of Confirmation Window>

FIG. 9 illustrates an example of operations of the MFP 100 of FIG. 1 during printing, and illustrates an appearing pattern regarding whether or not the confirmation window 25 is displayed when documents are placed into the feed tray. The confirmation window 25 may be displayed at the time the documents are placed in the feed tray 11 when the menu window 21 is being displayed. At this time, whether or not the confirmation window 25 is to be displayed is determined according to whether the print mode is the normal print mode or the saving print mode.

If the print mode is the normal print mode, the confirmation window 25 is not displayed. And if the start key 15 is then pressed, the document reading and the printing processes are started. By contrast, if the print mode is the saving print mode, the confirmation window 25 is displayed when the documents are placed into the feed tray. And if the start key 15 is then pressed when the confirmation window 25 is being displayed, the document reading and the printing processes are started.

Figure 10:
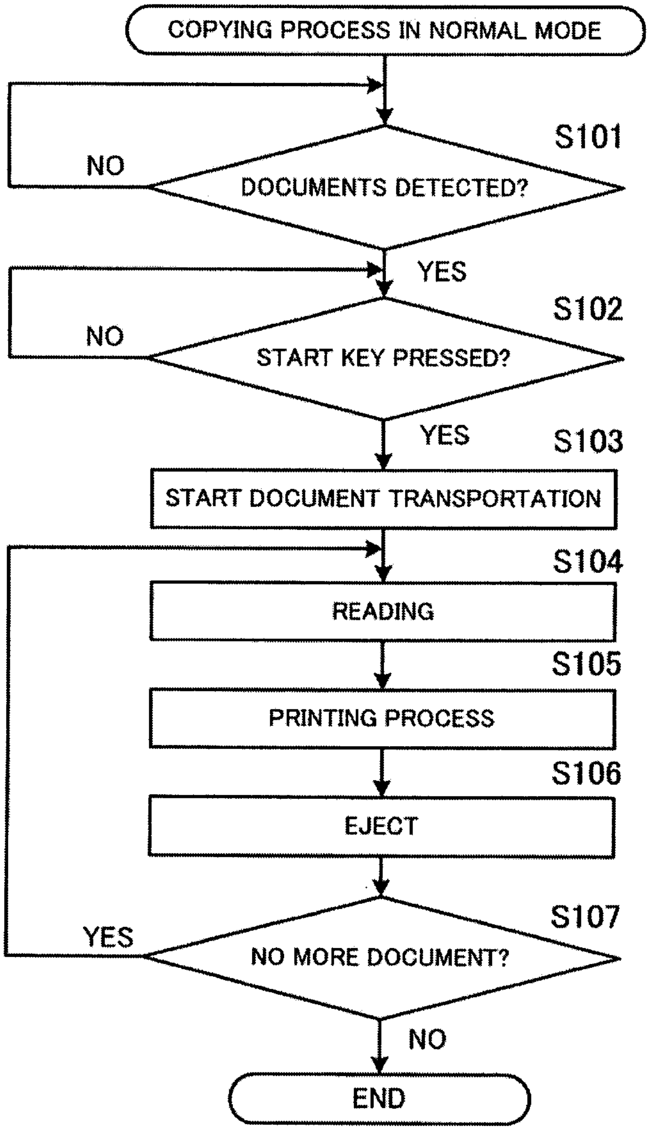
FIG. 10 is a flow chart illustrating an example of a copying process in the MFP 100 of FIG. 8 in the normal print mode.

FIG. 10 shows steps S101 through S107 in a flow chart illustrating an example of a copying process in the MFP 100 of FIG. 8 in the normal print mode. The document transporting unit 106 starts the document transportation when the start key 15 is pressed after the documents have been detected by the document detecting unit 105 (steps S101 through 103).

The reading unit 107 reads the documents transported from the feed tray 11 and generates the read images in order. The printing unit 108 prints the read images received from the reading unit 107 on paper based on the print settings of the normal print mode, and ejects the paper after printing to the eject tray 104 (steps S104 through S106). The procedure from step S104 to step S106 will be repeated until there is no more document left in the feed tray 11.

Figure 11:
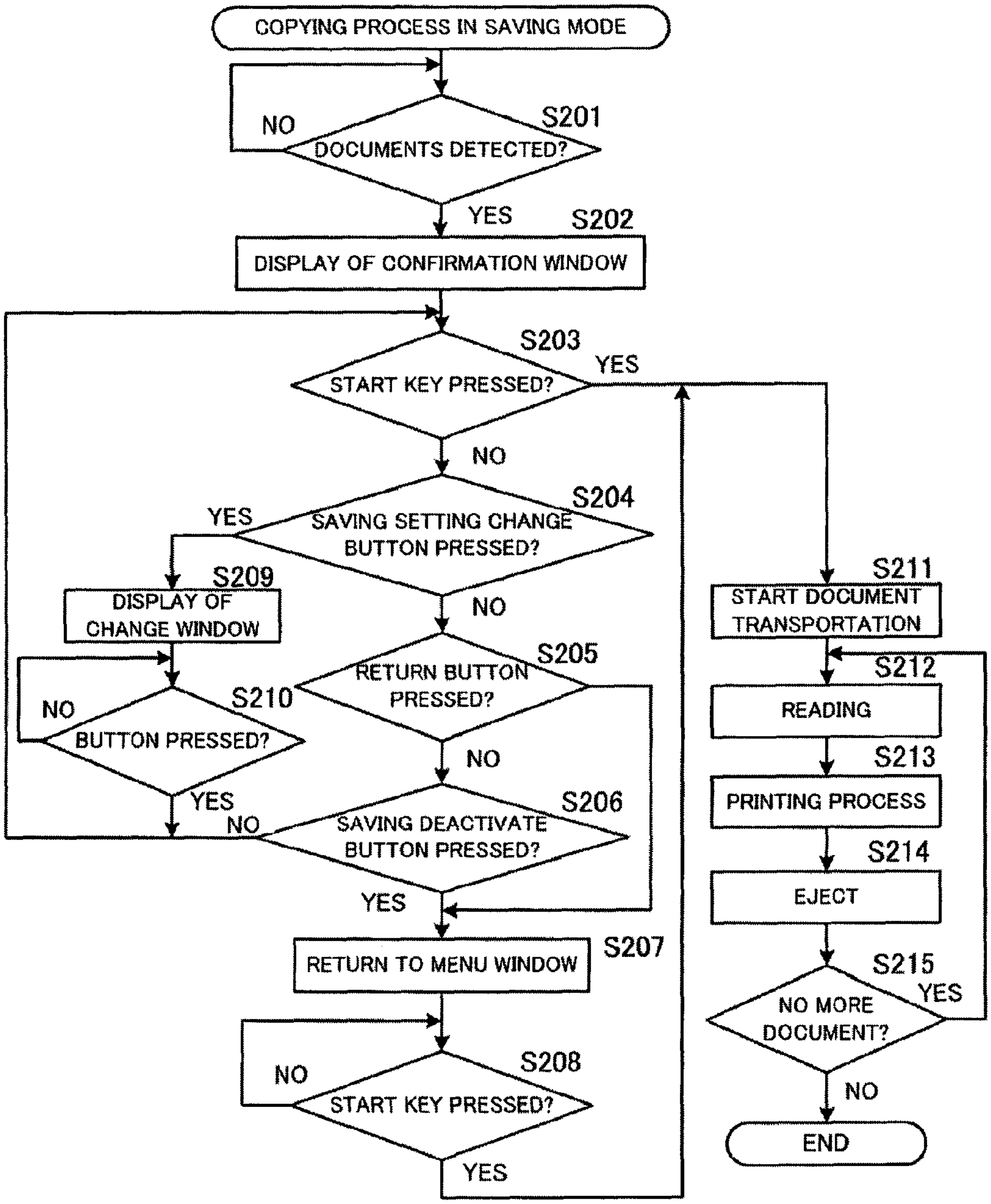
FIG. 11 is a flow chart illustrating an example of a copying process in the MFP 100 of FIG. 8 in the saving print mode.

FIG. 11 shows steps S201 through S215 in a flow chart illustrating an example of a copying process in the MFP 100 of FIG. 8 in the saving print mode. The confirmation window displaying unit 113 displays the confirmation window 25 on the display 14 when the documents are detected by the document detecting unit 105 (steps S201, S202).

The document transporting unit 106 starts the document transportation if the start key 15 is pressed (steps S203, S211). The reading unit 107 then reads the documents transported from the feed tray 11 and generates the read images in order. The printing unit 108 then prints the read images received from the reading unit 107 on paper based on the print settings of the saving print mode, and ejects the paper after printing to the eject tray 104 (steps S212 through S214). The procedure from step S212 to step S214 will be repeated until there is no more document left in the feed tray 11 (step S215).

By contrast, if the item selection button 42 on the confirmation window 25 is pressed, the change window displaying unit 114 displays the print setting change window corresponding to the item selection button 42 that has been pressed (steps S203, S204, S209). If the cancel button 38 on the print setting change window is then pressed, information of the print settings changed during the time between the display of the print setting change window and the input through the cancel button 38 is invalidated, and the original confirmation window 25 is displayed (step S210). Or, if the confirm button 39 is pressed, the print settings are confirmed and the original confirmation window 25 is then displayed (step S210).

If the return button 43 on the confirmation window 25 is pressed, the confirmation window 25 is closed and the original menu window 21 is then displayed (steps S203 through 205, S207). By contrast, if the saving deactivate button 44 on the confirmation window 25 is pressed, the saving print mode is deactivated and the menu window 21 of the normal print mode is then displayed (steps S203 through S207). The document transporting unit 106 starts the document transportation if the start key 15 is pressed after the menu window 21 has been returned to (steps S208, S211), and the procedure following step S212 will be executed.

According to the embodiment, since whether or not the confirmation window 25 is displayed is determined based on the print mode, whether or not the MFP 100 is in the saving print mode can be recognized through the display of the confirmation window 25 when documents are in the feed tray 11. Accordingly, printing the read images on paper without noticing the saving print mode can be prevented. Further, since the normal print mode may be selected based on an input through the saving deactivate button 44 on the confirmation window 25, the print mode can be changed easily when the user notices the saving print mode.

Embodiment 2

In Embodiment 1, a case has been described in which whether or not the confirmation window 25 is to be displayed is determined based on the print mode. On the other hand, another case will now be described in Embodiment 2 in which whether or not the confirmation window 25 is to be displayed is determined based on a display history of the print setting change window, such as the submenu window 22.

Figure 12:
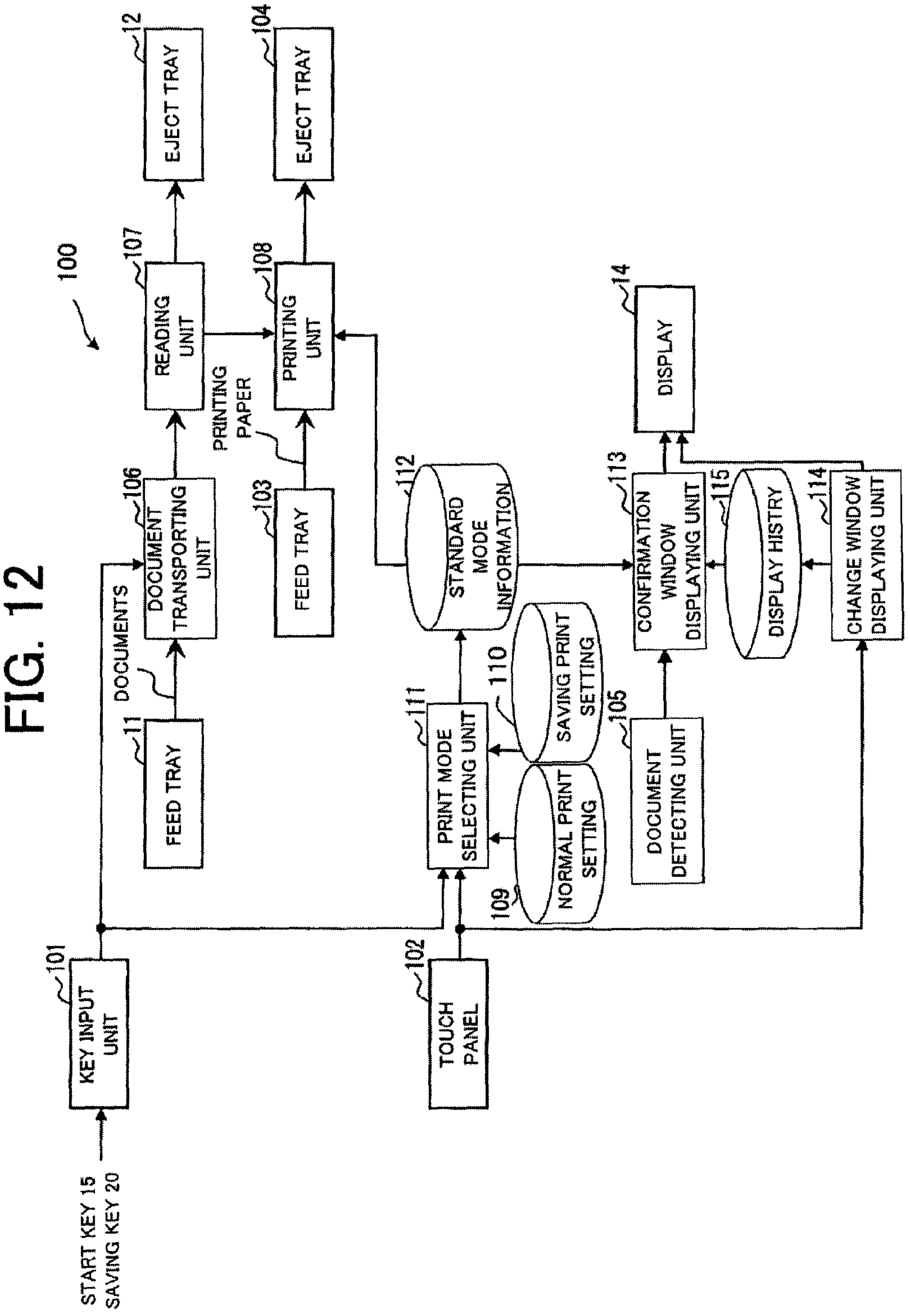
FIG. 12 is a block diagram illustrating an example of a configuration of a document reading apparatus according to Embodiment 2 of the present invention, and illustrates an example of another configuration of the MFP 100.

FIG. 12 illustrates an example of a configuration of a document reading apparatus according to Embodiment 2 of the present invention, and illustrates an example of another configuration of the MFP 100. The MFP 100 includes a display history storage unit 115, which distinguishes the MFP 100 of this embodiment from the MFP 100 of FIG. 8. The display history storage unit 115 stores the display history of the print setting change windows, such as the submenu window 22, the aggregate print setting window 23, and the double-sided print setting window 24.

When documents are detected by the document detecting unit 105, the confirmation window displaying unit 113 determines whether or not the confirmation window 25 is to be displayed based on the display history of the print setting change window prior to the detection of the documents. More specifically, if the print setting change window has been displayed during a given period of time prior to the detection of the documents, the confirmation window 25 is not displayed. On the other hand, if the print setting change window has not been displayed during the above period of time, the confirmation window 25 is displayed.

<Appearing Pattern of Confirmation Window>

FIG. 13 illustrates an example of operations in the MFP 100 of FIG. 12 during printing, and illustrates an appearing pattern regarding whether or not the confirmation window 25 is displayed when documents are placed into the feed tray. Whether or not the confirmation window 25 is to be displayed is determined according to the print mode and the display history of the print setting change window, such as the submenu window 22. If the print mode is the normal print mode, the confirmation window 25 is not displayed.

On the other hand, if the print mode is the saving print mode, whether or not the confirmation window 25 is to be displayed is determined based on whether or not there has been a display history of the print setting change window. In other words, if the print setting change window has been displayed during the time between the display of the menu window 21 and the detection of the documents, the confirmation window 25 is not displayed.

By contrast, if the print setting change window has not been displayed during the time between the display of the menu window 21 and the detection of the documents, the confirmation window 25 is displayed when the documents are placed into the feed tray. If the start key 15 is pressed when the confirmation window 25 is being displayed, the document reading and the printing processes are started.

Whether or not the confirmation window 25 is to be displayed is determined based on the display history of the print setting change window in this case. More specifically, it may also be determined based on the display history of the print setting change window which is either the aggregate setting window 23 or the double-sided setting window 24. For example, if only the aggregate setting window 23 has been displayed while the double setting window 24 has not been displayed during the time between the display of the menu window 21 and the detection of the documents, the confirmation window 25 may be displayed with different contents from those when there has been no display history of the print setting change window.

That is, the print settings for the aggregate printing may be unchangeable and displayed in a recognizable way indicating that the settings are unchangeable on the confirmation window 25. For example, while the setting details for the double-sided printing are displayed normally, the print settings for the aggregate printing are displayed with shading.

Further, if only the double-sided setting window 24 has been displayed while the aggregate setting window 23 has not been displayed, the confirmation window 25 may be displayed with different contents from those when there has been no display history of the print setting change window. That is, the print settings for the double-sided printing may be unchangeable and displayed in a recognizable way indicating that the setting details are unchangeable. For example, while the setting details for the aggregate printing are displayed normally, the print settings for the double-sided printing are displayed with shading.

By contrast, if both the aggregate setting window 23 and the double-sided setting window 24 have been displayed, the confirmation window 25 is not displayed. While a case has been described in which the print settings with the display history are displayed with shading if the print setting change window, i.e. either the aggregate setting window 23 or the double-sided setting window 24, has been displayed, the present invention is not limited to this. For example, as long as the items in the changeable print settings and the items in the unchangeable print settings can be visually distinguished on the display, the print settings may be displayed with a gray-out and the like.

Figure 14:
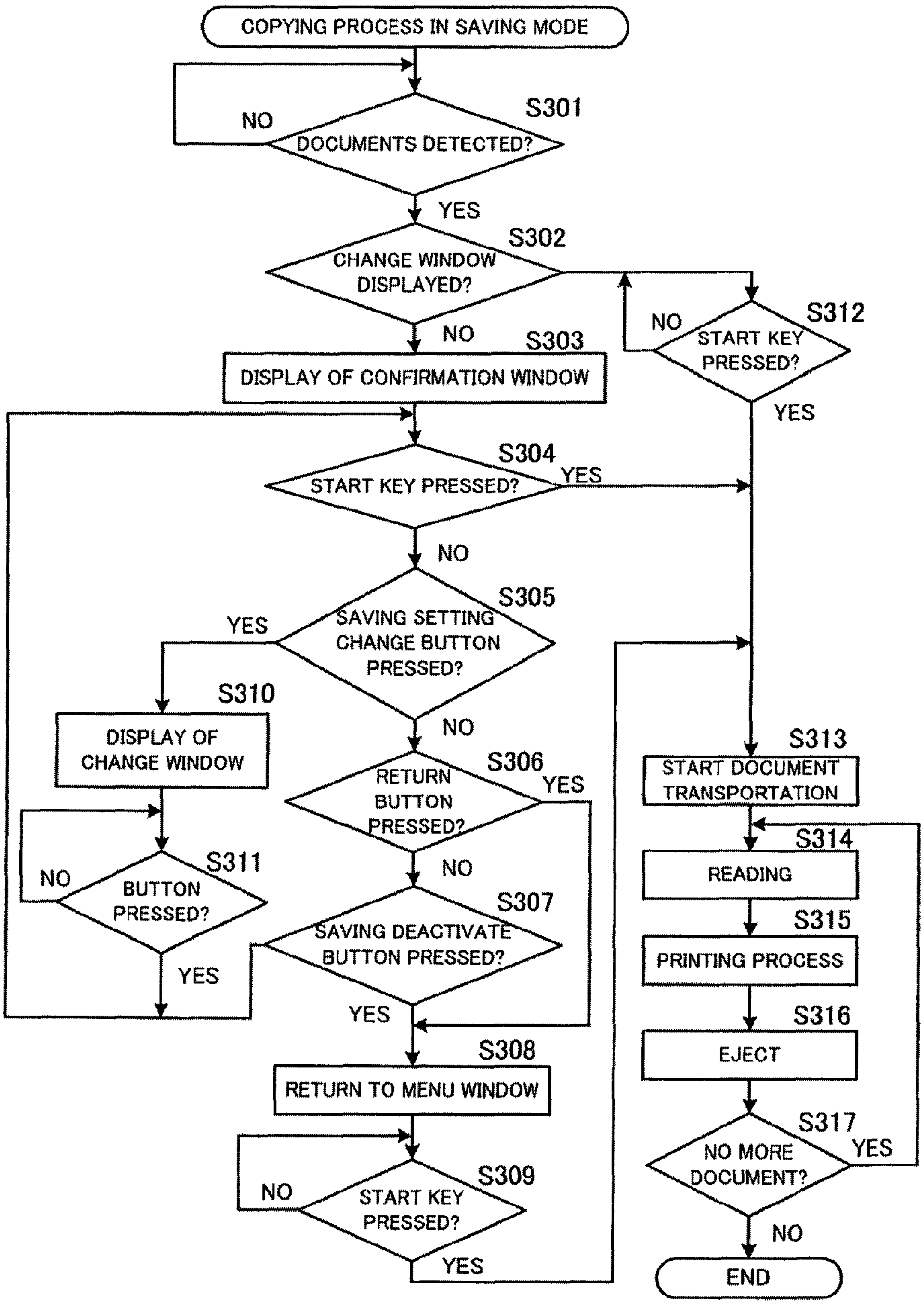
FIG. 14 is a flow chart illustrating an example of a copying process in the MFP 100 of FIG. 12 in the saving print mode.

FIG. 14 shows steps S301 through S317 in a flow chart illustrating an example of a copying process in the MFP 100 of FIG. 12 in the saving print mode. When documents are detected by the document detecting unit 105, the confirmation window displaying unit 113 displays the confirmation window 25 on the display 14 if the print setting change window has not been displayed prior to the time of the detection (steps S301 through S303).

The document transporting unit 106 then starts the document transportation if the start key 15 is pressed (steps S304 through S313). The reading unit 107 then reads documents transported from the feed tray 11 and generates the read images in order. The printing unit 108 prints the read images received from the reading unit 107 on paper based on the print settings of the saving print mode, and ejects the paper after printing to the eject tray 104 (steps S314 through S316). The procedure from step S314 to step S316 will be repeated until there is no more document left in the feed tray 11 (step S317).

By contrast, if the item selection button 42 on the confirmation window 25 is pressed, the change window displaying unit 114 displays the print setting change window corresponding to the item selection button 42 that has been pressed (step S304, S305, S310). If the cancel button 38 on the print setting change window is pressed, information of the print settings changed during the time between the display of the print setting change window and the input through the cancel button 38 is invalidated, and the original confirmation window 25 is then displayed (step S311). Or, if the confirm button 39 is pressed, the print settings are confirmed and the original confirmation window 25 is then displayed (step S311).

If the return button 43 on the confirmation window 25 is pressed, the confirmation window 25 is closed and the original menu window 21 is displayed (steps S304 through S306, S308). By contrast, if the saving deactivate button 44 on the confirmation window 25 is pressed, the saving print mode is deactivated and the menu window for the normal print mode is displayed (steps S304 through S308). The document transporting unit 106 then starts the document transportation if the start key 15 is pressed after the menu window 21 has been returned to (step S309, S313), and the procedure following step S314 will be executed.

When the documents are detected, if the print setting change window has been displayed prior to the time of the detection of the documents, the confirmation window 25 is not displayed. And if the start key 15 is then pressed, the procedure following step S314 will be executed.

According to this embodiment, since the confirmation window 25 is displayed based on the display history of the print setting change window displayed in response to an input through the item selection button, such as the application function button 31, whether or not the confirmation window 25 is to be displayed can be confirmed according to the display history by the time of the detection of the documents.

Embodiment 3

In Embodiments 1 and 2, a case has been described in which the confirmation window 25 is displayed based on the detection result at the document detecting unit 105. On the other hand, in Embodiment 3, another case will now be described in which the confirmation window 25 is displayed based on a start input for starting the document reading.

Figure 15:
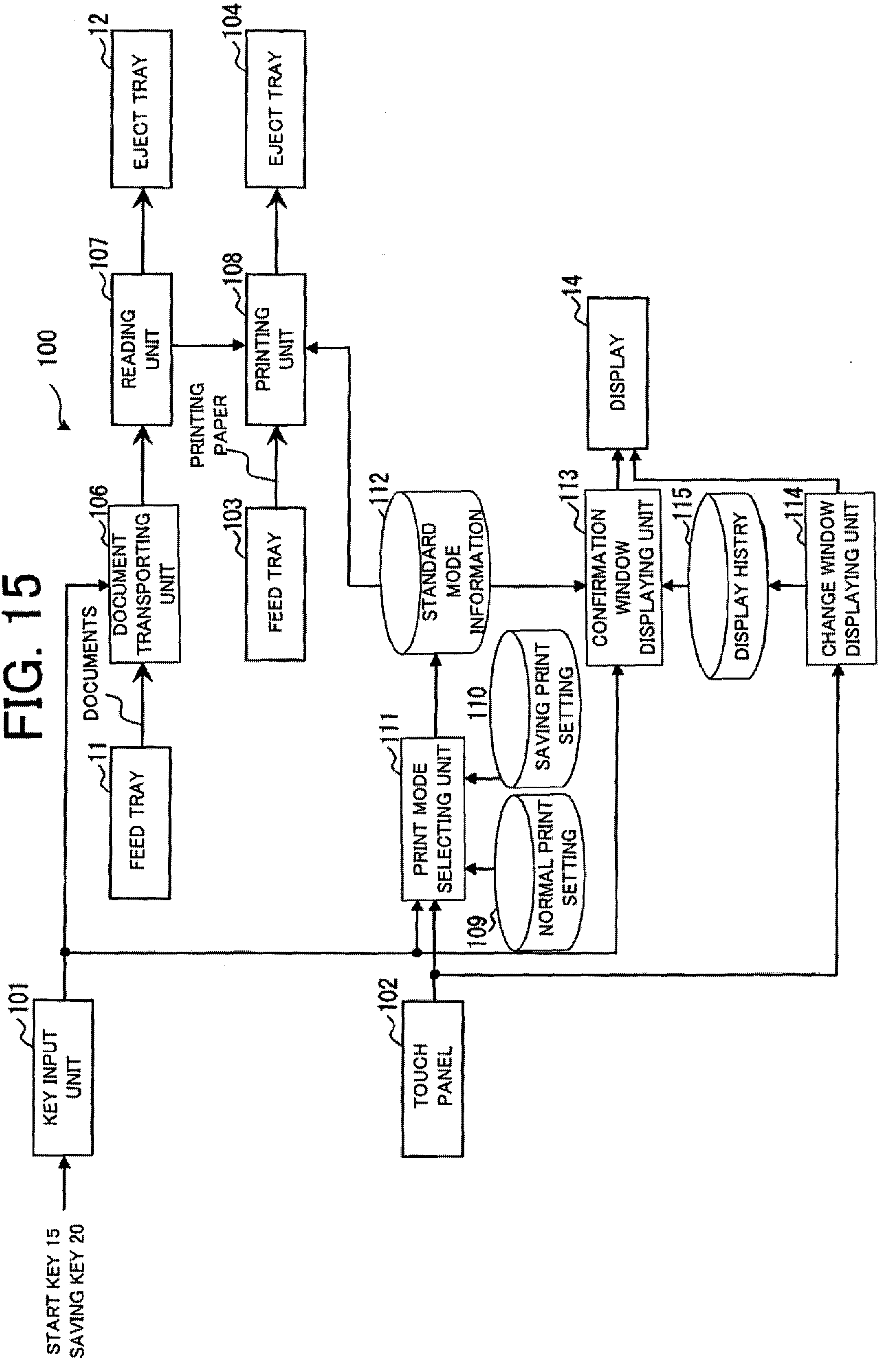
FIG. 15 is a block diagram illustrating an example of a configuration of a document reading apparatus according to Embodiment 3 of the present invention, and illustrates an example of another configuration of the MFP 100.

FIG. 15 illustrates an example of a configuration of a document reading apparatus according to Embodiment 3 of the present invention, and illustrates an example of another configuration of the MFP 100. The MFP 100 does not include the document detecting unit 105, which distinguishes the MFP 100 of this embodiment from the MFP 100 of FIG. 12.

The confirmation window displaying unit 113 displays the confirmation window 25 based on a predetermined first start input, for example, an input through the start key 15, which causes the document transporting unit 106 to start the document transportation so as to start the document reading. That is, the confirmation window 25 is displayed at the time of the input through the start key 15.

The confirmation window displaying unit 113 determines whether or not the confirmation window 25 is to be displayed based on the print mode. If the MFP 100 is in the saving print mode, the confirmation window 25 is displayed in response to an input through the start key 15. And if the MFP 100 is in the normal print mode, the confirmation window 25 is not displayed.

Further, when the start key 15 is pressed, the confirmation window displaying unit 113 may determine whether or not the confirmation window 25 is to be displayed based on the display history of the print setting change window prior to the input through the start key 15. More specifically, the confirmation window displaying unit 113 may not display the confirmation window 25 if the print setting change window has been displayed during a given period of time prior to the input through the start key 15. By contrast, if the print setting change window has not been displayed during the above period of time, the confirmation window displaying unit 113 displays the confirmation window 25.

The document transporting unit 106 starts the document transportation in response to the input through the start key 15 if the print mode is the normal print mode, and starts the document transportation in response to a second start input when the confirmation window 25 is being displayed if the print mode is the saving print mode. The second start input could be an input through the start key 15 or an input through a print start button arranged on the confirmation window 25.

<Appearing Pattern of Confirmation Window>

FIG. 16 illustrates an example of operations of the MFP 100 of FIG. 15 during printing, and illustrates an appearing pattern regarding whether or not the confirmation window 25 is displayed when the start key 15 is pressed. The confirmation window 25 may be displayed at the time of the input through the start key 15 when the menu window 21 is being displayed.

At this time, whether or not the confirmation window 25 is to be displayed is determined according to whether the print mode is the normal print mode or the saving print mode, and according to the display history of the print setting change window. If the print mode is the normal print mode, the confirmation window 25 is not displayed.

On the other hand, if the print mode is the saving print mode, whether or not the confirmation window 25 is to be displayed is determined according to the display history of the print setting change window. That is, if the print setting change window has been displayed during the time between the display of the menu window 21 and the input through the start key 15, the confirmation window 25 is not displayed.

By contrast, if the print setting change window has not been displayed prior to the input through the start key 15 after the display of the menu window 21, the confirmation window 25 is displayed when the start key 15 is pressed. If the start key 15 is pressed again during the display of the confirmation window 25, the document reading and the printing processes are started.

Figure 17:
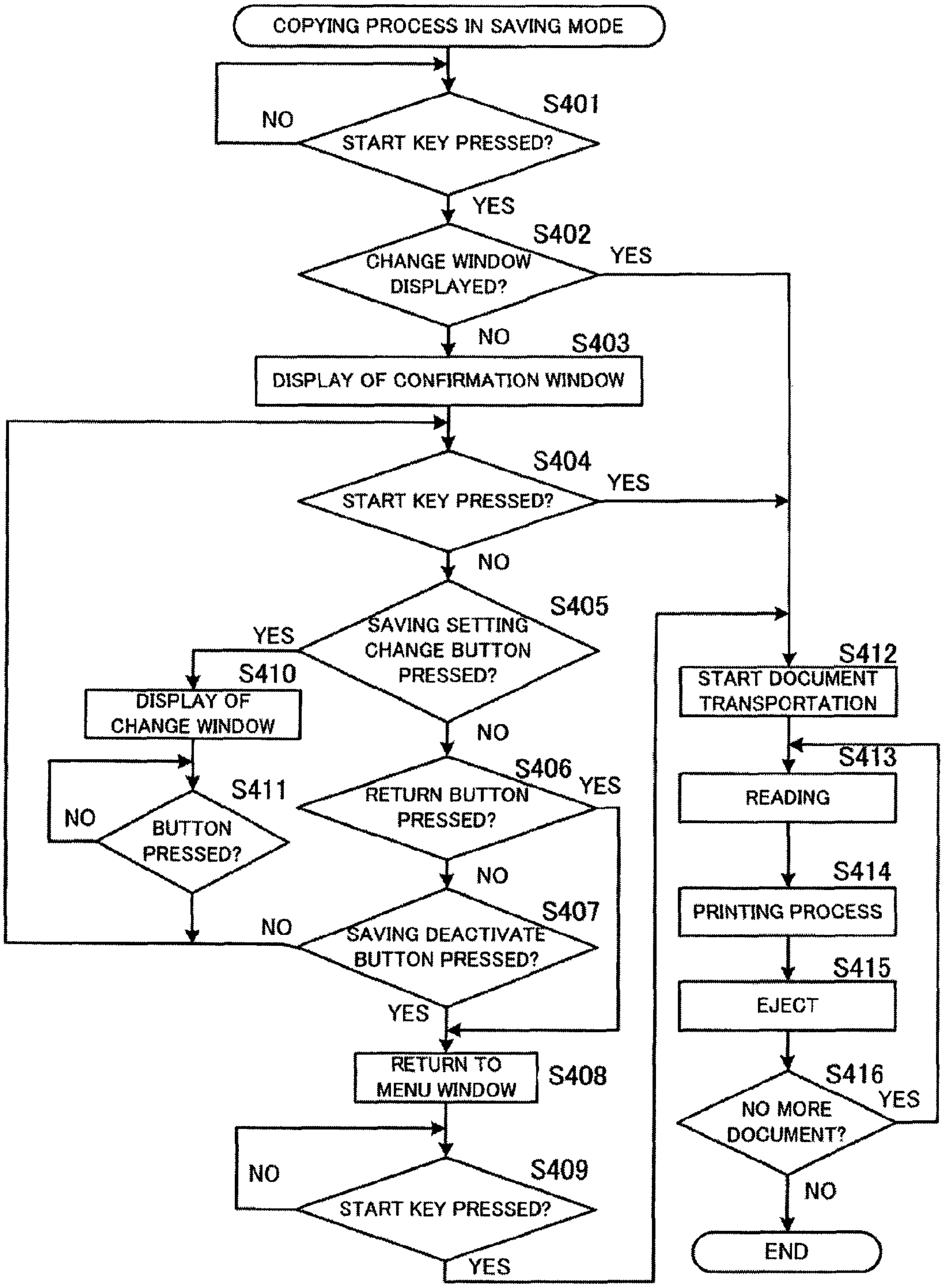
FIG. 17 is a flow chart illustrating an example of a copying process in the MFP 100 of FIG. 15 in the saving print mode.

FIG. 17 shows steps S401 through S416 in a flow chart illustrating an example of a copying process in the MFP 100 of FIG. 15 in the saving print mode. The confirmation window displaying unit 113 displays the confirmation window 25 when the start key 15 is pressed if the print setting change window has not been displayed prior to the input through the start key 15 (steps S401 through S403).

The document transporting unit 106 then starts the document transportation if the start key 15 is pressed (steps S404, S412). The reading unit 107 reads documents transported from the feed tray 11 and generates the read images in order. The printing unit 108 prints the read images on paper based on the print settings of the saving print mode, and ejects the paper after printing to the eject tray 104 (steps S413 through S415). The procedure from step S413 to step S415 will be repeated until there is no more document left in the feed tray 11 (step S416).

By contrast, the change window displaying unit 114 displays the print setting change window corresponding to the item selection button 42 that has been pressed (steps S404, S405, S410). If the cancel button 38 on the print setting change window is pressed, information of the print settings during the time between the display of the print setting change window and the input through the cancel button 38 is invalidated, and the original confirmation window 25 is displayed (step S411). Or, if the confirm button 39 is pressed, the print settings are confirmed and the original confirmation window 25 is displayed (step S411).

If the return button 43 on the confirmation window 25 is pressed, the confirmation window 25 is closed and the original menu window 21 is displayed (steps S404 through S406, S408). By contrast, if the saving deactivate button 44 on the confirmation window 25 is pressed, the saving print mode is deactivated and the menu window 21 of the normal print mode is displayed (steps S404 through S408). The document transporting unit 106 starts the document transportation if the start key 15 is pressed after the menu window 21 has been returned to (step S409, S412), and the procedure following step S413 will be executed.

When the start key is pressed, if the print setting change window has been displayed prior to the input through the start key, the confirmation window 25 is not displayed and the procedure following S412 will be executed. According to this embodiment, since whether or not the confirmation window 25 is to be displayed is determined based on the print mode, whether or not the MFP 100 is in the saving print mode can be recognized through the display of the confirmation window 25 when the start key 15 is pressed. Consequently, printing the read images on paper without noticing the saving print mode can be prevented.

In Embodiment 1 and 2, while a case has been described in which the documents in the feed tray 11 of the ADF unit 10 are detected so that the confirmation window 25 is displayed, the present invention is not limited to this. The present invention also includes a case in which the documents placed in a predetermined position before being read are detected so that the confirmation window 25 is displayed based on the detection result. For example, the documents placed on the document table may be detected so that the confirmation window is displayed.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A document reading apparatus comprising:

a print mode selecting unit configured to select either a normal print mode or a saving print mode as a print mode based on a user input, the normal print mode including predetermined print settings and the saving print mode including print settings associated with less paper consumption than the normal print mode;

a document containing unit arranged to hold at least two pieces of documents;

a document reading unit configured to read the documents in the document containing unit and to generate read images;

a document detecting unit configured to detect the documents in the document containing unit;

a confirmation window displaying unit configured to display a confirmation window based on a detection result from the document detecting unit, the confirmation window having a mode change button; and an image forming unit configured to form output images from the read images based on the print mode;

wherein the confirmation window displaying unit determines whether or not the confirmation window is to be displayed based on the print mode; and the print mode selecting unit selects the normal print mode as the print mode in response to an input through the mode change button.

2. The document reading apparatus according to claim 1, wherein the confirmation window displaying unit does not display the confirmation window if the print mode is the normal print mode.

3. The document reading apparatus according to claim 1, further comprising:

a print setting change window displaying unit configured to display a print setting change window for changing the print settings based on an input selection of an item arranged on a menu window; and a display history storage unit configured to store a display history of the print setting change window;

wherein, when the documents are detected by the document detecting unit, the confirmation window displaying unit determines whether or not the confirmation window is to be displayed based on the display history of the print setting change window prior to the detection of the documents.

4. The document reading apparatus according to claim 3, wherein the confirmation window displaying unit displays the confirmation window in a manner such that the print settings associated with a part of the print setting change window having the display history and the print settings associated with a different part of the print setting change window having no display history are visually distinguished.

5. The document reading apparatus according to claim 3, wherein current setting details are displayed on item selection buttons, the item selection buttons being targets of the input selection.

6. The document reading apparatus according to claim 1, wherein the confirmation window displaying unit displays the confirmation window including a message indicating that the print mode is the saving print mode.

7. The document reading apparatus according to claim 1, wherein the confirmation window includes item selection buttons indicating current setting details.

8. The document reading apparatus according to claim 7, wherein the item selection buttons include an aggregate button.

9. The document reading apparatus according to claim 7, wherein the item selection buttons include a double-sided button.

10. The document reading apparatus according to claim 1, wherein the mode change button is a button for switching the print mode from the saving print mode to the normal print mode.

11. A document reading apparatus comprising:

a print mode selecting unit configured to select either a normal print mode or a saving print mode as a print mode based on a user input, the normal print mode including predetermined print settings and the saving print mode including print settings associated with less paper consumption than the normal print mode;

a document containing unit arranged to hold at least two pieces of documents;

a document reading unit configured to read the documents in the document containing unit and to generate read images;

a confirmation window displaying unit configured to display a confirmation window based on a first start input for causing the document reading unit to start reading the documents, the confirmation window having a mode change button; and an image forming unit configured to form output images from the read images based on the print mode;

wherein the confirmation window displaying unit determines whether or not the confirmation window is to be displayed based on the print mode;

the document reading unit starts reading the documents in response to the first start input if the print mode is the normal print mode, and starts reading the documents in response to a second start input when the confirmation window is being displayed if the print mode is the saving print mode; and the print mode selecting unit selects the normal print mode as the print mode in response to an input through the mode change button.

12. The document reading apparatus according to claim 11, wherein the confirmation window displaying unit does not display the confirmation window if the print mode is the normal print mode.

13. The document reading apparatus according to claim 11 further comprising:

a print setting change window displaying unit configured to display a print setting change window for changing the print settings based on an input selection of an item arranged on a menu window; and a display history storage unit configured to store a display history of the print setting change window;

wherein, when the first start input is received, the confirmation window displaying unit determines whether or not the confirmation window is to be displayed based on the display history of the print setting change window prior to the first start input.

14. The document reading apparatus according to claim 13, wherein the confirmation window displaying unit displays the confirmation window in a manner such that the print settings associated with a part of the print setting change window having the display history and the print settings associated with a different part of the print setting change window having no display history are visually distinguished.

15. The document reading apparatus according to claim 13, wherein current setting details are displayed on item selection buttons, the item selection buttons being targets of the input selection.

16. The document reading apparatus according to claim 11, wherein the confirmation window displaying unit displays the confirmation window including a message indicating that the print mode is the saving print mode.

17. The document reading apparatus according to claim 11, wherein the confirmation window includes item selection buttons indicating current setting details.

18. The document reading apparatus according to claim 17, wherein the item selection buttons include an aggregate button.

19. The document reading apparatus according to claim 17, wherein the item selection buttons include a double-sided button.

20. The document reading apparatus according to claim 11, wherein the mode change button is a button for switching the print mode from the saving print mode to the normal print mode.

21. A document reading method comprising:

selecting either a normal print mode or a saving print mode as a print mode based on a user input, the normal print mode including predetermined print settings and the saving print mode including print settings associated with less paper consumption than the normal print mode;

reading documents in a document containing unit arranged to hold at least two pieces of documents and generating read images;

detecting the documents in the document containing unit;

determining whether a confirmation window is to be displayed based on the print mode;

when the confirmation window is to be displayed, displaying a confirmation window based on a result of the detecting, the confirmation window having a mode change button; and forming output images from the read images based on the print mode;

the normal print mode is selected as the print mode in response to an input through the mode change button.

22. The document reading method according to claim 21, wherein the confirmation window is not displayed if the print mode is the normal print mode.

23. The document reading method according to claim 21 further comprising:

displaying a print setting change window for changing the print settings based on an input selection of an item arranged on a menu window; and storing a display history of the print setting change window, wherein, when the documents are detected in the document containing unit, whether or not the confirmation window is to be displayed is determined based on the display history of the print setting change window prior to the detection of the documents.

24. The document reading method according to claim 21, wherein the confirmation window including a message indicating that the print mode is the saving print mode is displayed.

25. A document reading method comprising:

selecting either a normal print mode or a saving print mode as a print mode based on a user input, the normal print mode including predetermined print settings and the saving print mode including print settings associated with less paper consumption than the normal print mode;

reading documents in the document containing unit arranged to hold at least two pieces of documents and generating read images;

determining whether a confirmation window is to be displayed based on the print mode;

when the confirmation window is to be displayed, displaying a confirmation window based on a first start input for causing the reading of the documents to start, the confirmation window having a mode change button; and forming output images from the read images based on the print mode;

the reading of the documents is started in response to the first start input if the print mode is the normal print mode, and is started in response to a second start input when the confirmation window is being displayed if the print mode is the saving print mode;

the normal print mode is selected as the print mode in response to an input through the mode change button.

26. The document reading method according to claim 25, wherein the confirmation window is not displayed if the print mode is the normal print mode.

27. The document reading method according to claim 25 further comprising:

displaying a print setting change window for changing the print settings based on an input selection of an item arranged on a menu window; and storing a display history of the print setting change window;

wherein, when the first start input is received, whether or not the confirmation window is to be displayed is determined based on the display history of the print setting change window prior to the first start input.

28. The document reading method according to claim 25, wherein the confirmation window including a message indicating that the print mode is the saving print mode is displayed.

* * * * *